United States Patent
Kwon et al.

(10) Patent No.: US 9,991,498 B2
(45) Date of Patent: Jun. 5, 2018

(54) ELECTRODE ASSEMBLY AND SECONDARY BATTERY INCLUDING THE SAME

(71) Applicant: Samsung Electronics Co., Ltd., Suwon-si, Gyeonggi-do (KR)

(72) Inventors: Moonseok Kwon, Hwaseong-si (KR); Jaeman Choi, Hwaseong-si (KR); Kuntae Kwon, Suwon-si (KR); Euncheol Do, Seoul (KR); Yeonil Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 277 days.

(21) Appl. No.: 14/478,046

(22) Filed: Sep. 5, 2014

(65) Prior Publication Data

US 2015/0072204 A1 Mar. 12, 2015

(30) Foreign Application Priority Data

Sep. 9, 2013 (KR) .................. 10-2013-0108057
Aug. 25, 2014 (KR) .................. 10-2014-0111042

(51) Int. Cl.
*H01M 2/26* (2006.01)
*H01M 10/04* (2006.01)
*H01M 10/0525* (2010.01)

(52) U.S. Cl.
CPC ............ *H01M 2/263* (2013.01); *H01M 2/26* (2013.01); *H01M 10/0431* (2013.01);
(Continued)

(58) Field of Classification Search
CPC .................................. H01M 4/64; H01M 2/263
See application file for complete search history.

(56) References Cited

U.S. PATENT DOCUMENTS

| 5,872,744 | A | 2/1999 | Taylor |
| 7,704,633 | B2 | 4/2010 | Endo et al. |

(Continued)

FOREIGN PATENT DOCUMENTS

| EP | 2477267 A1 | 7/2012 |
| JP | 2000235853 A | 8/2000 |

(Continued)

OTHER PUBLICATIONS

Extended European Search Report for European Patent Application No. 14183812.8 dated Feb. 10, 2015.

(Continued)

*Primary Examiner* — Ula C Ruddock
(74) *Attorney, Agent, or Firm* — Cantor Colburn LLP

(57) ABSTRACT

An electrode assembly includes an electrode jelly-roll, which includes a winding including a first electrode plate, a second electrode plate, and a separator disposed between the first and second electrode plates; an outer surface parallel to a winding axis of the prismatic electrode jelly-roll, side surfaces perpendicular to the winding axis; a first electrode tab, which is electrically connected to the first electrode plate and extends in a winding axis direction of the prismatic electrode jelly-roll; a second electrode tab, which is electrically connected to the second electrode plate and extends in a winding axis direction of the electrode jelly-roll, wherein an end portion of at least one of the first electrode tab and the second electrode tab is bent in a direction opposite to the direction in which the corresponding electrode tab extends and faces an outer surface of the prismatic electrode jelly-roll.

34 Claims, 28 Drawing Sheets

(52) U.S. Cl.
CPC .... *H01M 10/0436* (2013.01); *H01M 10/0525* (2013.01); *H01M 2220/30* (2013.01)

(56) References Cited

U.S. PATENT DOCUMENTS

| | | | |
|---|---|---|---|
| 7,939,218 B2 | 5/2011 | Niu | |
| 2002/0146620 A1* | 10/2002 | Connell | H01M 2/0277 |
| | | | 429/161 |
| 2003/0108787 A1 | 6/2003 | Endo et al. | |
| 2004/0048151 A1* | 3/2004 | Hayashi | H01M 2/263 |
| | | | 429/162 |
| 2006/0063068 A1* | 3/2006 | Cheon | H01M 10/0431 |
| | | | 429/161 |
| 2006/0127751 A1* | 6/2006 | Woo | H01M 2/1653 |
| | | | 429/128 |
| 2006/0166088 A1* | 7/2006 | Hokanson | A61N 1/378 |
| | | | 429/161 |
| 2007/0166611 A1* | 7/2007 | Oh | H01M 2/22 |
| | | | 429/160 |
| 2008/0187838 A1 | 8/2008 | Le | |
| 2008/0206628 A1 | 8/2008 | Honbou | |
| 2009/0305120 A1* | 12/2009 | Blomgren | H01M 4/661 |
| | | | 429/94 |
| 2010/0014217 A1 | 1/2010 | Kawahara et al. | |
| 2011/0117404 A1 | 5/2011 | Ahn et al. | |
| 2011/0129718 A1 | 6/2011 | Lee | |
| 2011/0183169 A1 | 7/2011 | Bhardwaj et al. | |
| 2012/0058390 A1 | 3/2012 | Obayashi et al. | |
| 2012/0183825 A1 | 7/2012 | Lee et al. | |
| 2012/0208055 A1 | 8/2012 | Ahn | |
| 2013/0040201 A1 | 2/2013 | Manthiram et al. | |
| 2013/0083496 A1 | 4/2013 | Franklin et al. | |
| 2013/0101872 A1* | 4/2013 | Yang | H01M 4/64 |
| | | | 429/7 |
| 2013/0108907 A1 | 5/2013 | Bhardwaj et al. | |
| 2013/0171490 A1 | 7/2013 | Rothkopf et al. | |

FOREIGN PATENT DOCUMENTS

| | | |
|---|---|---|
| JP | 2010-108794 A | 5/2010 |
| JP | 4768562 B2 | 6/2011 |
| KR | 20020077388 A | 10/2002 |
| KR | 1020050030039 A | 3/2005 |
| KR | 100490548 B1 | 5/2005 |
| KR | 100515835 B1 | 9/2005 |
| KR | 100601515 B1 | 7/2006 |
| KR | 100614359 B1 | 8/2006 |
| KR | 100614375 B1 | 8/2006 |
| KR | 100833808 B1 | 5/2008 |
| KR | 1020110061281 A | 6/2011 |
| KR | 1020110065923 A | 6/2011 |
| KR | 1020120082808 A | 7/2012 |
| KR | 1020140035689 A | 3/2014 |
| KR | 1020140061955 A | 5/2014 |
| KR | 1020140077622 A | 6/2014 |

OTHER PUBLICATIONS

Korean Office Action for Korean Patent Application No. 10-2014-011042 dated Sep. 17, 2015.

\* cited by examiner

ELECTRODE ASSEMBLY AND SECONDARY BATTERY INCLUDING THE SAME

RELATED APPLICATIONS

This application claims priority to and the benefit of Korean Patent Application Nos. 10-2013-0108057, filed on Sep. 9, 2013, and 10-2014-0111042, filed on Aug. 25, 2014, both in the Korean Intellectual Property Office, and all the benefits accruing therefrom under 35 U.S.C. § 119, the contents of both of which are incorporated herein in their entirety by reference.

BACKGROUND

1. Field

The present disclosure relates to an electrode assembly and a secondary battery including the same, and more particularly, to an electrode assembly with improved energy density and flexibility regarding shapes of a battery and a secondary battery including the same.

2. Description of the Related Art

Unlike a primary battery, a secondary battery is a battery that may be charged and discharged and is widely used in the latest electronic devices, e.g., cellular phones, laptop computers, and camcorders.

Particularly, a lithium secondary battery features higher voltage and higher energy density per unit weight as compared to a nickel-cadmium battery and a nickel-hydride battery. These batteries are widely used as power sources for portable electronic devices, and demands for lithium secondary batteries are increasing.

Such a lithium secondary battery uses a lithium oxide as a positive electrode active material and a carbon-based material as a negative electrode material. Generally, lithium secondary batteries are categorized as liquid electrolyte batteries and polymer electrolyte batteries, based on the type of electrolyte. A battery using a liquid electrolyte is referred to as a lithium ion battery, whereas a battery using a polymer electrolyte is referred to as a lithium polymer battery. Furthermore, lithium secondary batteries are being manufactured in various configurations, the most popular of which are cylindrical can, prismatic can, and pouch configurations.

Generally, a jelly-roll type electrode assembly, which is formed by inserting a separator between a positive electrode plate and a negative electrode plate and winding the structure in a spiral shape, or a stacked electrode assembly, which is formed by stacking a plurality of positive electrode plates and a plurality of negative electrode plates by interposing a separator therebetween, is widely used in a lithium secondary battery. For example, a cylindrical battery is manufactured by accommodating a cylindrical jelly-roll type electrode assembly in a cylindrical can, injecting an electrolyte into the cylindrical can, and sealing the cylindrical can, whereas a prismatic battery is manufactured by press-deforming the jelly-roll type electrode assembly or a stacked electrode assembly to a prismatic shape and accommodating the deformed prismatic jelly-roll type electrode assembly in a prismatic can. Furthermore, a pouch-type battery is manufactured by packaging a jelly-roll type electrode assembly or a stacked electrode assembly and electrolyte with a pouch-type housing. In such an electrode assembly, a positive electrode tab and a negative electrode tab may be led out to an outside from a positive electrode plate and a negative electrode plate and may be connected to a positive electrode terminal and a negative electrode terminal of a secondary battery, respectively. Nonetheless, there remains a need for other configurations.

SUMMARY

According to an example embodiment, an electrode assembly includes an electrode jelly-roll, which includes a winding including a first electrode plate, a second electrode plate, and a separator disposed between the first and second electrode plates, an outer surface parallel to a winding axis of the electrode jelly-roll, side surfaces perpendicular to the winding axis; a first electrode tab, which is electrically connected to the first electrode plate and extends in a winding axis direction of the electrode jelly-roll; and a second electrode tab, which is electrically connected to the second electrode plate and extends in a winding axis direction of the electrode jelly-roll, wherein an end portion of at least one of the first electrode tab and the second electrode tab is bent in a direction opposite to the direction in which the corresponding electrode tab extends and faces the outer surface of the electrode jelly-roll.

The first electrode plate may include a first current collector and a positive active material applied on the first current collector, the second electrode plate may include a second current collector and a negative active material applied on the second current collector, wherein the first electrode tab is fixed to an active material non-coated portion of the current collector, on which the positive active material is not applied, and the second electrode tab is fixed to an active material non-coated portion of the current collector, on which the negative active material is not applied.

The first electrode plate may include a first current collector and a positive active material applied on the first current collector, the second electrode plate may include a second current collector and a negative active material applied on the second current collector, wherein the first electrode tab is a portion of an active material non-coated portion of the current collector, which protrudes and extends in a direction perpendicular to the lengthwise direction of the first current collector, and the second electrode tab is a portion of an active material non-coated portion of the current collector, which protrudes and extends in a direction perpendicular to the lengthwise direction of the second current collector.

The first electrode tab and the second electrode tab may be configured to function as lead tabs.

The outer surface may include a top surface and a bottom surface, which are flat and face each other, and the electrode jelly-roll may further include two curved surfaces between the top surface and the bottom surface.

The first electrode tab and the second electrode tab may be led out from a same side surface.

The first electrode tab and the second electrode tab may be led out from two opposite side surfaces.

A line extending from the first electrode tab in a winding axis direction and a line extending from the second electrode tab in a winding axis direction may overlap each other.

A line extending from the first electrode tab in a winding axis direction and a line extending from the second electrode tab in a winding axis direction may not overlap each other.

Location of a portion at which the first electrode plate is connected to the first electrode tab may be different from location of a portion at which the second electrode plate is connected to the second electrode tab in the height-wise direction of the electrode jelly-roll.

The first electrode tab may be bent to face the top surface, and the second electrode tab may be bent to face the bottom surface.

At least one of the first electrode tab and the second electrode tab may include a first tab portion buried in the electrode jelly-roll, a second tab portion facing one of the side surfaces, and a third tab portion facing the top surface or the bottom surface, wherein the first tab portion and the third tab portion may extend in a winding axis direction, and the second tab portion may extend in a direction perpendicular to the winding axis, such that the first tab portion and the third tab portion do not overlap each other.

At least one of the first electrode tab and the second electrode tab may further include a fourth tab portion, which extends from the third tab portion in a direction perpendicular to the winding axis.

The first electrode plate may include a first current collector and a first active material applied on the first current collector, the second electrode plate may include a second current collector and a second active material applied on the second current collector, and an end portion of an active material non-coated portion of the first current collector, which does not contact the first active material and is exposed to outside the electrode jelly-roll, may forms the first electrode tab, and an end portion of an active material non-coated portion of the second current collector, which does not contact the second active material and is exposed to an outside of the electrode jelly-roll, may form the second electrode tab.

At least one of the end portion of an active material non-coated portion of the first current collector, which is exposed to outside, and the end portion of an active material non-coated portion of the second current collector, which is exposed to outside, may be folded to be led out in a winding axis direction.

The portion of the end portion of the first current collector or the second current collector, which is folded to be led out in a winding axis direction, may be bent in a direction opposite to the lead out direction.

The first electrode plate may include a first current collector and a first active material applied on the first current collector, the second electrode plate may include a second current collector and a second active material applied on the second current collector, and an end portion of an active material non-coated portion of the first current collector, which does not contact the first active material, may form an outer surface of the electrode jelly-roll.

A portion of the second electrode tab may be buried in the electrode jelly-roll and may be led out from the inside of the electrode jelly-roll, and the first electrode tab may be disposed on an end portion of the active material non-coated portion of the first current collector exposed to outside.

A plurality of electrode tabs may be disposed on a single electrode jelly-roll.

An end portion of at least one of the first electrode tab and the second electrode tab facing an outer surface of the electrode jelly-roll may include a first portion parallel to the winding axis and a second portion, which extends from the first portion in a direction perpendicular to the winding axis and parallel to an outer surface of the electrode jelly-roll.

An end portion of at least one of the first electrode tab and the second electrode tab facing an outer surface of the electrode jelly-roll may further includes a third portion, which extends from the second portion in a direction perpendicular to the winding axis and perpendicular to the outer surface of the electrode jelly-roll.

A length of the first electrode tab may be different from that of the second electrode tab.

The electrode assembly may further include a first wiring, which is electrically connected to the first electrode tab and extends in a direction perpendicular to the winding axis; and a second wiring, which may be electrically connected to the second electrode tab and extends in a direction perpendicular to the winding axis.

The electrode assembly may further includes a first lead tab, which is electrically connected to the first wiring and extends in a direction perpendicular to the winding axis; and a second lead tab, which is electrically connected to the second wiring and extends in a direction perpendicular to the winding axis.

The first and second lead tabs may be formed to have sheet-like shapes, and widths of the first and second wirings may be from 10 times to 10000 times greater than thicknesses thereof.

The first and second wirings may include at least one of aluminum, copper, stainless steel, and nickel.

The electrode assembly may further include a first lead tab, which is electrically connected to the first electrode tab and extends in a direction perpendicular to the winding axis; and a second lead tab, which is electrically connected to the second electrode tab and extends in a direction perpendicular to the winding axis.

The electrode assembly may include a plurality of electrode jelly-rolls; and a plurality of first and second electrode tabs disposed at the plurality of electrode jelly-rolls, respectively, wherein the plurality of electrode jelly-rolls are electrically connected in series.

The electrode jelly-roll may include a top surface and a bottom surface, which are parallel to the winding axis, two side surfaces, which are perpendicular to the winding axis and face each other, and two curved surfaces between the top surface and the bottom surface, wherein a distance between the top surface and the bottom surface may be constant, and the top surface and the bottom surface may be curved.

A distance between an end portion of at least one of the first and second electrode tabs disposed to face an outer surface of the electrode jelly-roll and an outer surface of the electrode jelly-roll may be smaller than or equal to 1 millimeter (mm).

The minimum radius of curvature at the bent portion of the at least one of the first electrode tab and the second electrode tab may be from about 0.006 mm to about 5 mm.

According to another example embodiment, an electrode assembly includes a stacked electrode structure including a first electrode plate, a second electrode plate, and a separator, wherein the separator is disposed between the first electrode plate and the second electrode plate, and wherein the stacked electrode structure includes an outer surface, which is perpendicular to a stacking direction, and side surfaces, which are parallel to the stacking direction and face each other; a first electrode tab, which is electrically connected to the first electrode plate and extends from one of the first and second side surfaces of the stacked electrode structure; and a second electrode tab, which is electrically connected to the second electrode plate and extends from one of the first and second side surfaces of the stacked electrode structure, wherein an end portion of at least one of the first electrode tab and the second electrode tab is bent in a direction opposite to a lead-out direction and is disposed to face the outer surface of the stacked electrode structure.

The electrode assembly may further include a first wiring, which is electrically connected to the first electrode tab and faces the outer surface of the stacked electrode structure; and a second wiring, which is electrically connected to the second electrode tab and faces the outer surface of the stacked electrode structure.

The stacked electrode structure may include a plurality of first electrode plates and a plurality of second electrode plates, and the electrode assembly may include a plurality of first electrode tabs which are electrically connected to the plurality of first electrode plates and are bent together toward the outer surface of the stacked electrode structure, respectively, and a plurality of second electrode tabs which are electrically connected to the plurality of second electrode plates and are bent together toward the outer surface of the stacked electrode structure, respectively.

The first electrode tab may include a first portion, which is lead out from one of surfaces of the stacked electrode structure and a second portion, which is bent by about 90 degrees to simultaneously face the outer surface and one of side surfaces of the stacked electrode structure, and the first portion and the second portion of the first electrode tab may be connected to each other on the one of the side surfaces of the stacked electrode structure.

The first portion of the first electrode tab may be bent by to surround two outer surfaces of the second portions.

According to another example embodiment, a secondary battery includes a casing; an electrode assembly disposed in the casing; and an electrolyte disposed with the electrode assembly in the casing, wherein the electrode assembly includes an electrode jelly-roll, which includes a winding including a first electrode plate, a second electrode plate, and a separator disposed between the first and second electrode plates, an outer surface parallel to a winding axis, first and second side surfaces perpendicular to the winding axis and facing each other; a first electrode tab, which is electrically connected to the first electrode plate and extends in a winding axis direction of the electrode jelly-roll; and a second electrode tab, which is electrically connected to the second electrode plate and extends in a winding axis direction of the electrode jelly-roll, wherein an end portion of at least one of the first electrode tab and the second electrode tab is bent in a direction opposite to the direction in which the corresponding electrode tab extends and is disposed to face an outer surface of the electrode jelly-roll.

At least a portion of a first electrode tab or a second electrode tab of the electrode assembly, or at least a portion of a first lead tab or a second lead tab connected to the first electrode tab of the second electrode tab, may extend to the outside the casing.

According to another example embodiment, an electronic device includes a secondary battery, wherein the secondary battery includes: a casing; an electrode assembly disposed in the casing; and an electrolyte disposed with the electrode assembly in the casing, wherein the electrode assembly includes an electrode jelly-roll, which includes a winding including a first electrode plate, a second electrode plate, and a separator disposed between the first and second electrode plates, an outer surface parallel to a winding axis of the jelly-roll, side surfaces perpendicular to the winding axis; a first electrode tab, which is electrically connected to the first electrode plate and extends in a winding axis direction of the electrode jelly-roll; and a second electrode tab, which is electrically connected to the second electrode plate and extends in a winding axis direction of the electrode jelly-roll, wherein an end portion of at least one of the first electrode tab and the second electrode tab is bent in a direction opposite to the direction in which the corresponding electrode tab extends and faces an outer surface of the electrode jelly-roll.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
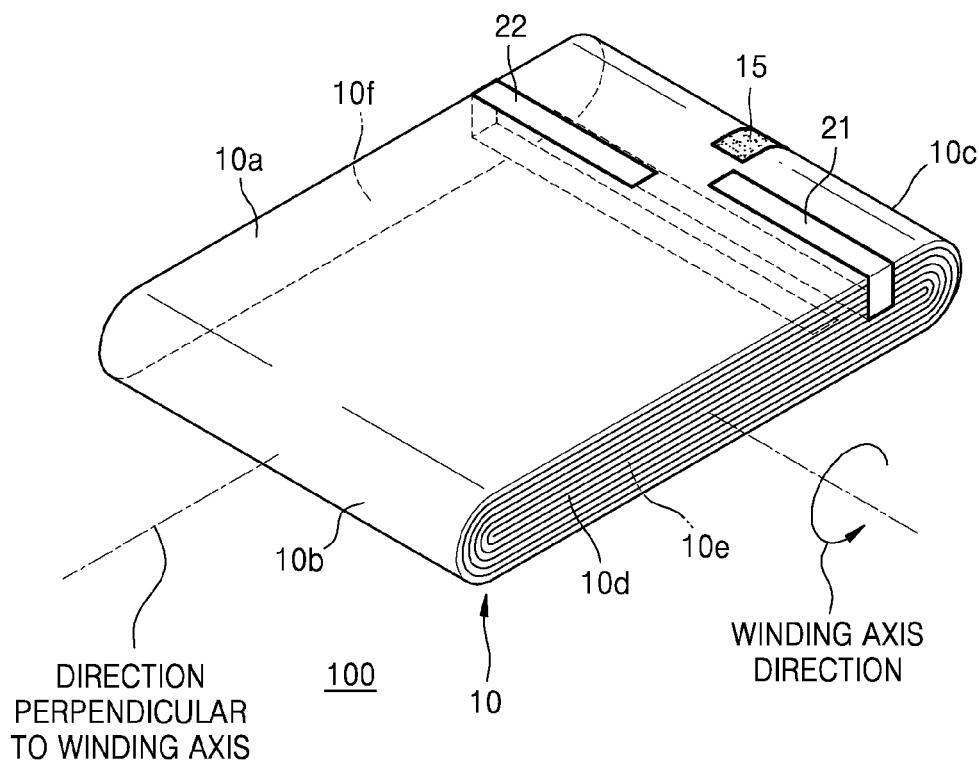
FIG. 1 is a schematic perspective view of an embodiment of an electrode assembly.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present disclosure will now be described more fully with reference to the accompanying drawings, in which exemplary embodiments are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. In the drawings, the sizes of elements are exaggerated for clarity.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 4:
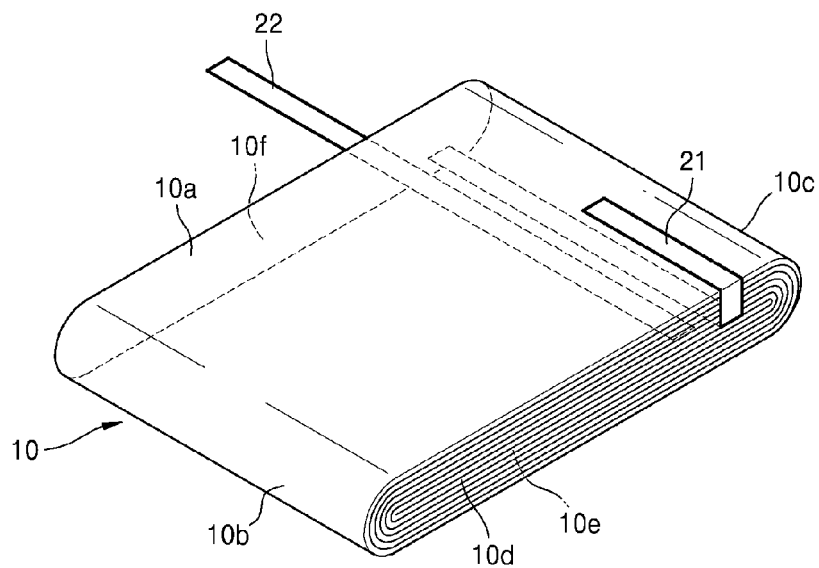
FIGS. 4 through 17 and 21 through 25 are perspective views of configurations of embodiments of various electrode assemblies.

FIG. 1 is a schematic perspective view of an embodiment of an electrode assembly 100. Referring to FIG. 1, the electrode assembly 100 may be a jelly-roll type electrode assembly including an electrode jelly-roll 10 and first and second electrode tabs 21 and 22, which extend, e.g., are led out, from the electrode jelly-roll 10. Here, an end portion of at least one of the first electrode tab 21 and the second electrode tab 22 may be bent in a direction opposite to the direction in which the corresponding electrode tab extends, e.g., is led out, and may face an outer surface of the electrode jelly-roll 10. Although FIG. 1 shows an example in which both the first electrode tab 21 and the second electrode tab 22 face an outer surface of the electrode jelly-roll 10, only one of the first electrode tab 21 and the second electrode tab 22 may be disposed to face an outer surface of the electrode jelly-roll 10, as shown in FIG. 4.

The electrode jelly-roll 10 may be formed to have a flat and prismatic shape as shown in FIG. 1 by winding a first electrode plate, a second electrode plate, and a separator disposed between the first and second plates, and press-deforming the winding, e.g., the wound structure. Here, before press-deforming the wound electrode jelly-roll 10, the electrode jelly-roll 10 may be wrapped with a tape 15, for example, to prevent the electrode jelly-roll 10 from being unwound. Outer surfaces of the electrode jelly-roll 10 may include a top surface 10a and a bottom surface 10e that are parallel to the winding axis. Furthermore, the electrode jelly-roll 10 may include two, e.g., first and second, side surfaces 10d and 10f, which are perpendicular to the winding axis and face each other, and two, e.g., first and second, curved surfaces 10b and 10c between the top surface 10a and the bottom surface 10e. The top surface 10a and the bottom surface 10e are formed as flat surfaces, and a distance between the top surface 10a and the bottom surface 10e may be substantially constant.

The first electrode tab 21 is electrically connected to a first electrode plate, whereas the second electrode tab 22 is electrically connected to the second electrode plate. Furthermore, as shown in FIG. 1, the first and second electrode tabs may be respectively led out from the two side surfaces 10d and 10f of the electrode jelly-roll 10 in a direction of the winding axis of the electrode jelly-roll 10. The first electrode tab 21 may be led out from the first side surface 10d perpendicular to the winding axis and may be bent by about 180 degrees (in other words, in a direction opposite to the lead out direction), such that an end portion thereof faces the top surface 10a of the electrode jelly-roll 10. Furthermore, the second electrode tab 22 may be led out from the second side surface 10f perpendicular to the winding axis and may be bent by about 180 degrees, such that an end portion thereof faces the top surface 10a of the electrode jelly-roll 10

Here, the minimum radius of curvature at the bent portions of the first electrode tab 21 and the second electrode tab 22 may be from about 0.006 millimeter (mm) to about 5 mm, 0.01 mm to about 1 mm, or 0.05 mm to about 0.5 mm. If the minimum radius of curvature is smaller than 0.006 mm, the first electrode tab 21 and the second electrode tab 22 may be easily damaged. If the minimum radius of curvature is greater than 5 mm, the first electrode tab 21 and the second electrode tab 22 may excessively protrude toward the side surfaces 10d and 10f, and thus energy density of a secondary battery may decrease. Furthermore, the end portions of the first electrode tab 21 and the second electrode tab 22 may either closely contact the top surface 10a of the electrode jelly-roll 10 or be separated therefrom at a distance. For example, considering that an energy density of a secondary battery may decrease if distances between the first electrode tab 21 and the second electrode tab 22 and the top surface 10a are too large, the distances between the first electrode tab 21 and the second electrode tab 22 and the top surface 10a may be within 1 mm, 0.7 mm, or 0.5 mm.

Figure 2:
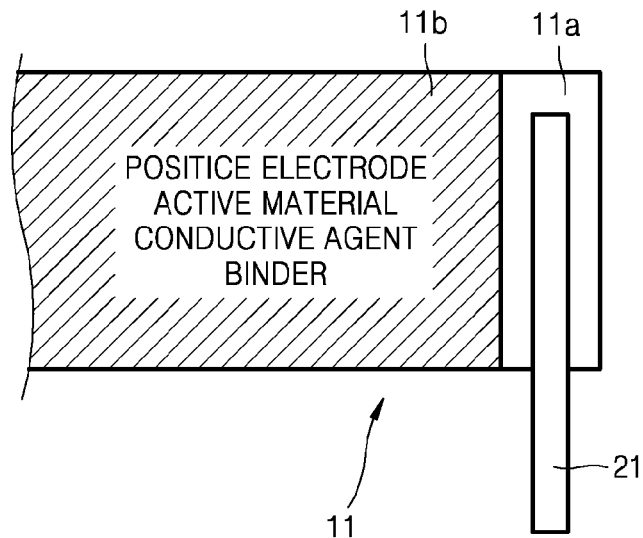
FIG. 2 is a diagram showing schematic configuration of a portion of an embodiment of a positive electrode plate used in the electrode jelly-roll of FIG. 1.
Figure 3:
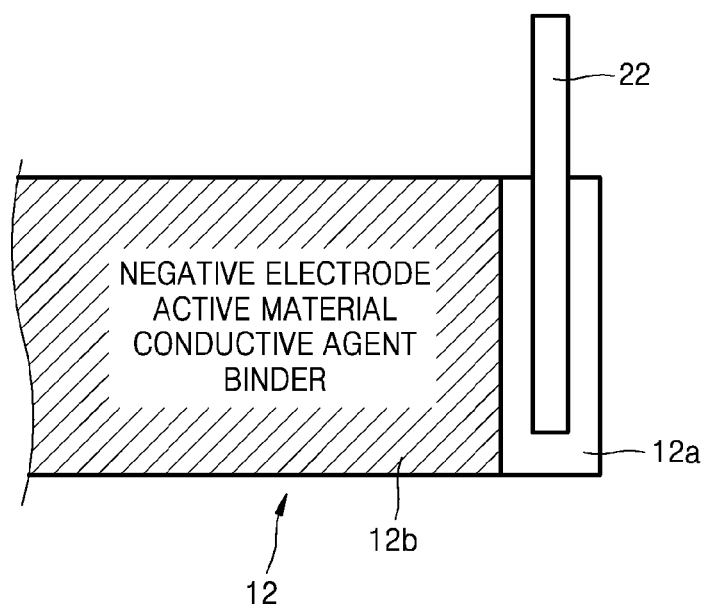
FIG. 3 is a diagram showing schematic configuration of a portion of an embodiment of a negative electrode plate used in the electrode jelly-roll of FIG. 1.

FIGS. 2 and 3 are diagrams showing schematic configurations of electrode plates 11 and 12 and the electrode tabs 21 and 22 used in the electrode jelly-roll 10. Referring to FIG. 2, a first electrode plate 11 may be a positive electrode plate, for example. In this case, the first electrode plate 11 may include a current collector 11a, which extends in a direction and functions as a substrate, and a positive active material 11b, which is disposed on, e.g., applied on, the current collector 11a. The positive active material 11b may further contain a conductive agent and a binder. The first electrode tab 21 may be fixed at an end portion of the current collector 11a on which the positive active material 11b is not disposed (that is, a positive active material non-coated portion). For example, the first electrode tab 21 may be welded or soldered to the current collector 11a.

Furthermore, referring to FIG. 3, a second electrode plate 12 may be a negative electrode plate, for example. In this case, the second electrode plate 12 may include a current collector 12a, which extends in a direction and functions as a substrate, and a negative active material 12b, which is disposed on the current collector 12a. The negative active material 12b may further contain a conductive agent and a binder. The second electrode tab 22 may be fixed at an end portion of the current collector 12a on which the negative active material 12b is not disposed (that is, a negative active material non-coated portion). For example, the second electrode tab 22 may be welded or soldered to the current collector 12a.

The electrode jelly-roll 10 may be formed by interposing a separator (not shown) between the first electrode plate 11 and the second electrode plate 12, shown in FIGS. 2 and 3, and winding the first electrode plate 11 and the second electrode plate 12 from portions at which the first electrode tab 21 and the second electrode tab 22 are fixed. As a result, portions of the first electrode tab 21 and the second electrode tab 22 are disposed in, e.g., buried in, the electrode jelly-roll 10, and the remaining portions of the first electrode tab 21 and the second electrode tab 22 are exposed to an outside of the electrode jelly-roll 10. As described above, after the electrode jelly-roll 10 is press-deformed to a flat prismatic shape, the exposed portion of the first electrode tab 21 or the second electrode tab 22 may be bent to face an outer surface of the electrode jelly-roll 10, that is, the top surface 10a or the bottom surface 10e.

According to the present embodiment, by limiting protrusion of the first electrode tab 21 and the second electrode tab 22 in a direction toward side surfaces of the electrode assembly 100, a shape of a secondary battery including the electrode assembly 100 may be selected more freely. Therefore, a shape of an electronic device employing a secondary battery according to an example embodiment may be selected more freely. Particularly, a secondary battery having a shape suitable for a mobile electronic device in which a high degree of design freedom is demanded. Also, an energy density of the secondary battery may further increase.

Also, although FIG. 1 shows that the first and second electrode tabs 21 and 22 are led out from the two side surfaces 10d and 10f in directions parallel to the winding axis of the electrode jelly-roll 10, the present embodiment is not limited thereto. If desired, at least one of the first and second electrode tabs 21 and 22 may be led out in a direction tilted with, e.g., having a non-zero angle with, respect to the winding axis of the electrode jelly-roll 10. The first and second electrode tabs 21 and 22 may be led out in any suitable direction, including a winding axis direction.

FIGS. 4 through 17 and 21 through 25 are perspective views of configurations of other various embodiments of electrode assemblies.

First, referring to FIG. 4, only one first electrode tab 21 may face the outer surface of the electrode jelly-roll 10, not both the first electrode tab 21 and the second electrode tab 22 face an outer surface of the electrode jelly-roll 10 as disclosed above.

Figure 5:
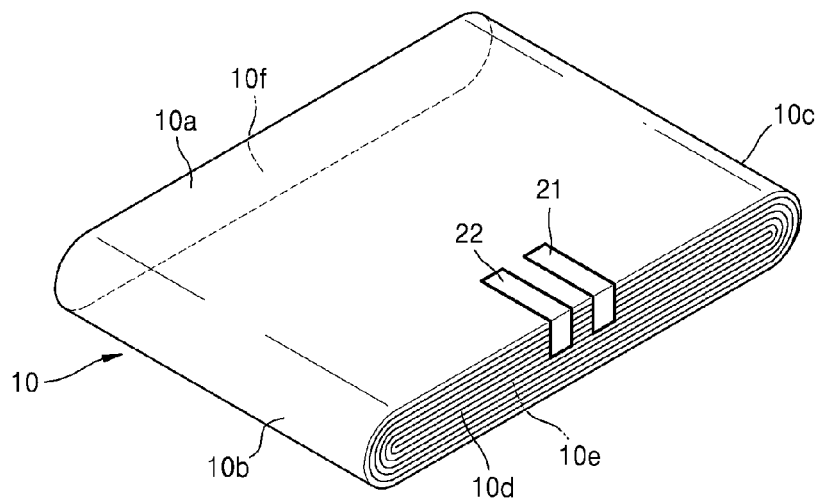
Figure 6:
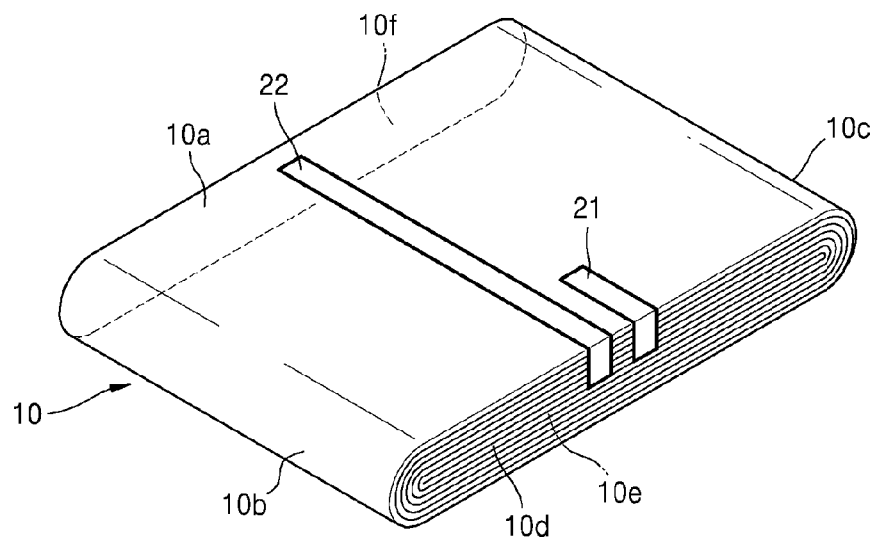
Figure 7:
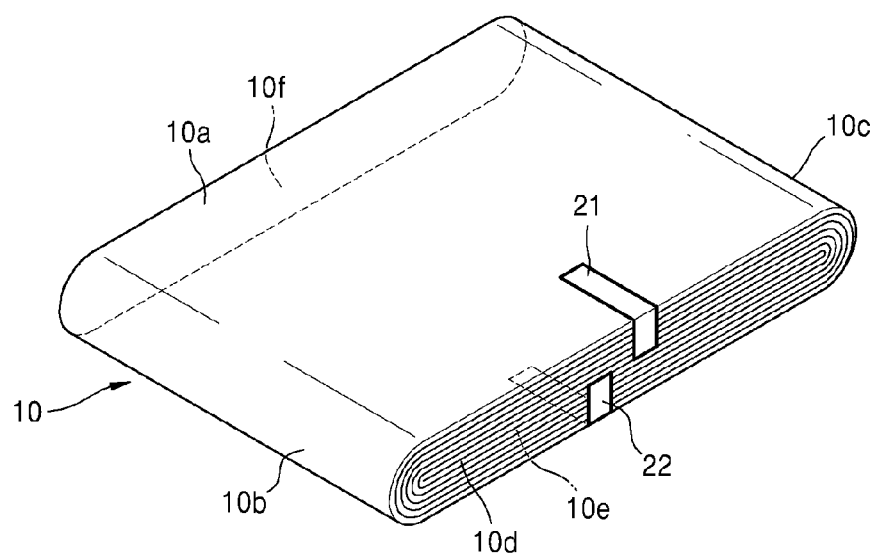

Furthermore, although FIG. 1 shows that the first electrode tab 21 and the second electrode tab 22 are respectively led out from the two opposite side surfaces 10d and 10f, the first electrode tab 21 and the second electrode tab 22 may be led out from the same side surface 10d as shown in FIG. 5. Here, lengths of led out portions of the first electrode tab 21 and the second electrode tab 22 may be the same as shown in FIG. 5 or may differ from each other as shown in FIG. 6.

Furthermore, although FIG. 1 shows that both the first electrode tab 21 and the second electrode tab 22 are bent to face the top surface 10a of the electrode jelly-roll 10, the present embodiment is not limited thereto. For example, referring to FIG. 7, the first electrode tab 21 may be bent to face the top surface 10a, whereas the second electrode tab 22 may be bent to face the bottom surface 10e of the electrode jelly-roll 10.

Figure 8:
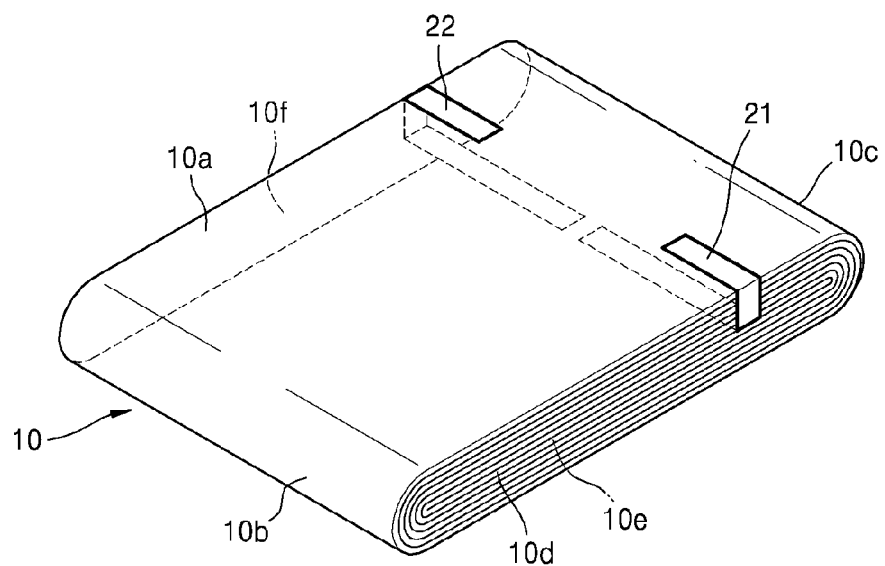
Figure 9:
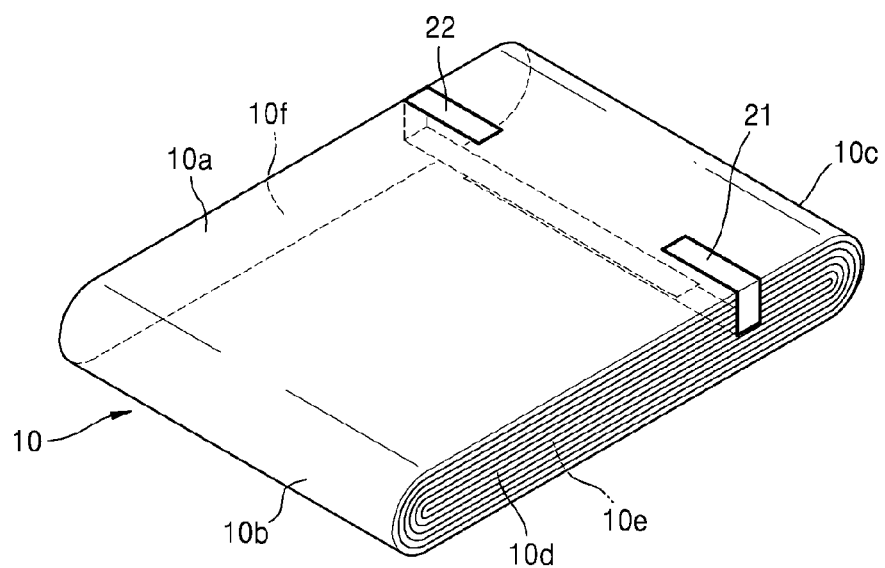

If the first electrode tab 21 and the second electrode tab 22 are respectively led out from the opposite side surfaces 10d and 10f of the electrode jelly-roll 10, the first electrode tab 21 and the second electrode tab 22 may be alternately disposed to not face each other. In other words, a line extending from the first electrode tab 21 in a winding axis direction may not overlap a line extending from the second electrode tab 22 in a winding axis direction. However, as shown in FIG. 8, the first electrode tab 21 and the second electrode tab 22 may be aligned so as to be disposed to face each other. In other words, a line extending from the first electrode tab 21 in a winding axis direction may overlap a line extending from the second electrode tab 22 in a winding axis direction. In this case, a portion at which the first electrode plate 11 is connected to the first electrode tab 21 may be different from a portion at which the second electrode plate 12 is connected to the second electrode tab 22 in height-wise direction of the electrode jelly-roll 10 as shown in FIG. 9. Therefore, as shown in FIG. 9, when viewed in a direction perpendicular to the top surface 10a of the electrode jelly-roll 10, a portion of the first electrode tab 21 and a portion of the second electrode tab 22 buried in the electrode jelly-roll 10 may overlap each other.

Figure 10:
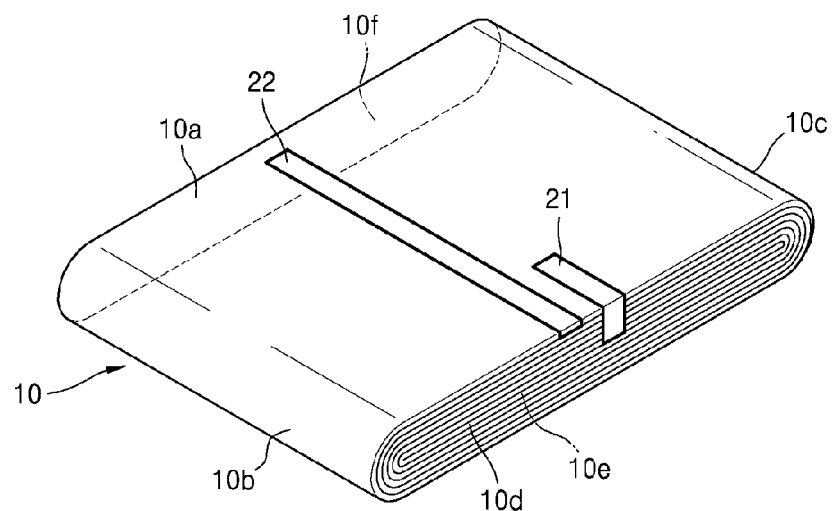

Furthermore, as shown in FIG. 10, in an embodiment wherein the first electrode tab 21 and the second electrode tab 22 are led out from the same side surface 10d, a portion at which at which the first electrode plate 11 is connected to the first electrode tab 21 may be different from a portion at which the second electrode plate 12 is connected to the second electrode tab 22 in height-wise direction of the electrode jelly-roll 10. In other words, a height of a portion of the electrode jelly-roll 10 from which the first electrode tab 21 is led out may be different from a height of a portion of the electrode jelly-roll 10 from which the second electrode tab 22 is led out.

Figure 11:
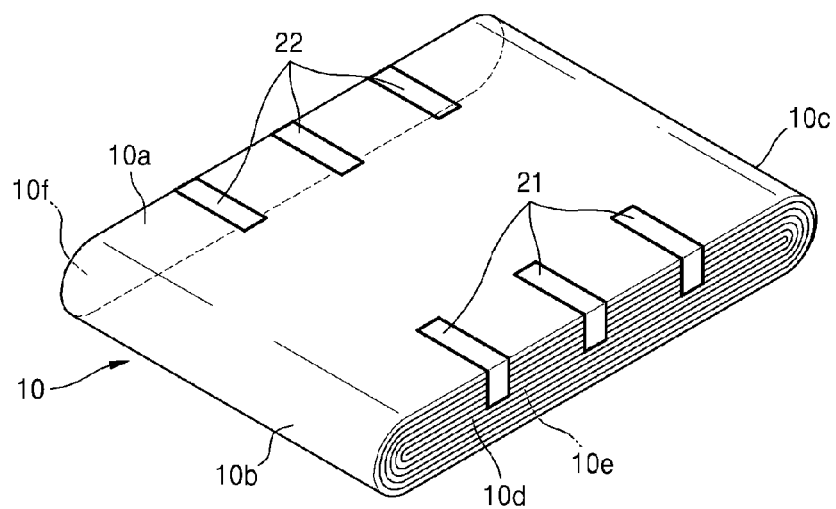

Furthermore, referring to FIG. 11, a plurality of first electrode tabs 21 and a plurality of second electrode tabs 22 may be disposed at the single electrode jelly-roll 10. FIG. 11 shows that the three first electrode tabs 21 are led out from the first side surface 10d of the electrode jelly-roll 10 and the three second electrode tabs 22 are led out from the second side surface 10f of the electrode jelly-roll 10. Furthermore, the first electrode tabs 21 and the second electrode tabs 22 are disposed to face each other. Also, as described above, the plurality of first and second electrode tabs 21 and 22 may be led out from a same side surface, or the plurality of first electrode tabs 21, and the plurality of second electrode tabs 22, which are respectively led out in opposite directions, may be alternately disposed.

In the descriptions given above, it is assumed that end portions of the first and second electrode tabs 21 and 22 facing an outer surface of the electrode jelly-roll 10 have simple linear shapes. However, shapes of the end portions of the first and second electrode tabs 21 and 22 may vary if desired.

Figure 12:
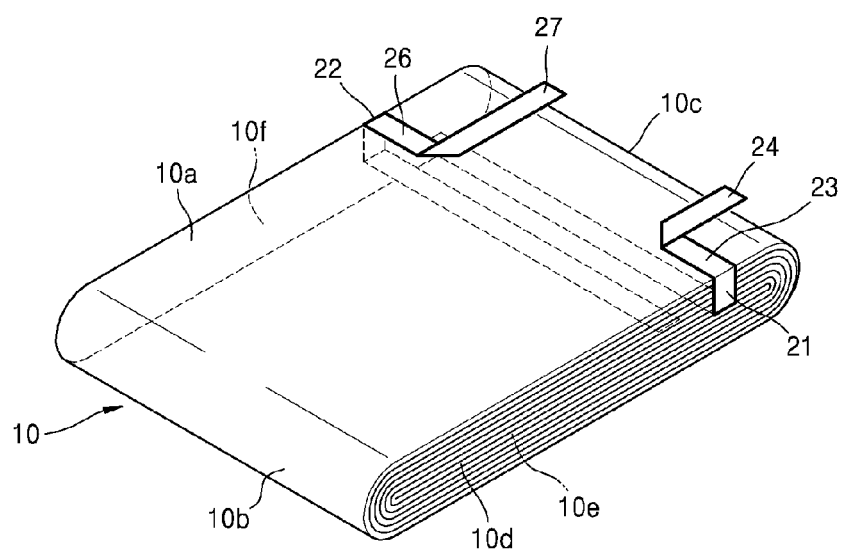

For example, referring to FIG. 12, end portions of the first and second electrode tabs 21 and 22 may be bent once toward the curved surface 10c of the electrode jelly-roll 10. In other words, the end portions of the first and second electrode tabs 21 and 22 may include first portions 23 and 26, which are parallel to the winding axis, and second portions 24 and 27, which extend from the first portions 23 and 26 in directions perpendicular to the winding axis, respectively. Here, the first portions 23 and 26 may be arranged to be tilted, e.g., have a non-zero angle, with respect to the winding axis, whereas the second portions 24 and 27 may be arranged to be tilted, e.g., have a non-zero angle, with respect to a direction perpendicular to the winding axis. Furthermore, both the first portions 23 and 26 and the second portions 24 and 27 may extend in a direction which is parallel to an outer surface (e.g., the top surface 10a) of the electrode jelly-roll 10. As shown in FIG. 12, the second portions 24 and 27 may extend over the curved surface 10c of the electrode jelly-roll 10 and protrude out of the electrode jelly-roll 10.

Figure 13:
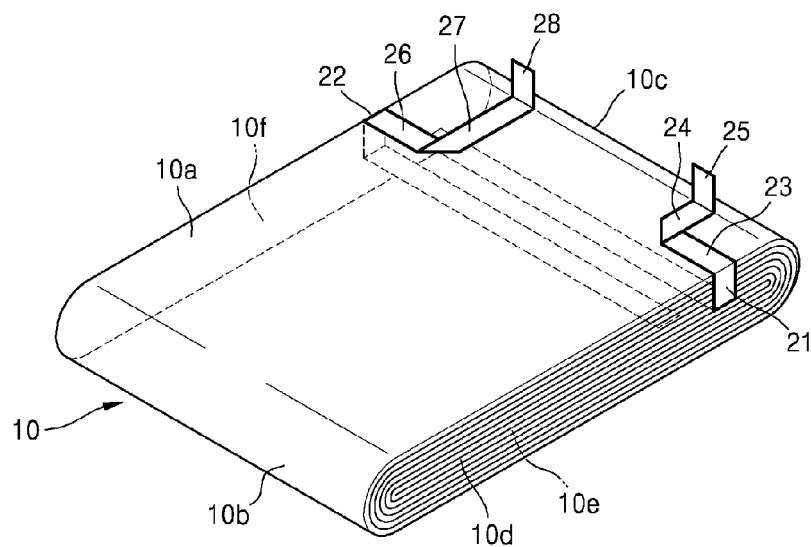

Furthermore, as shown in FIG. 13, the end portions of the first and second electrode tabs 21 and 22 may further include third portions 25 and 28, which respectively extend from the second portions 24 and 27 in a direction perpendicular to the winding axis and perpendicular to the top surface 10a of the electrode jelly-roll 10. For example, the third portions 25 and 28 may protrude in perpendicular to the top surface 10a.

Although FIGS. 12 and 13 show that both the end portions of the first and second electrode tabs 21 and 22 include the second portions 24 and 27 and the third portions 25 and 28, in an embodiment only one of the first and second electrode tabs 21 and 22 may include the second portions 24 and 27 or the third portions 25 and 28. Furthermore, although FIGS. 12 and 13 show that the second portions 24 and 27 are bent in a same direction, the second portions 24 and 27 may be bent independently, e.g., in directions opposite to each other. For example, the second portion 24 of the first electrode tab 21 may be bent toward the curved surface 10c, whereas the second portion 27 of the second electrode tab 22 may be bent toward the curved surface 10b.

Figure 14:
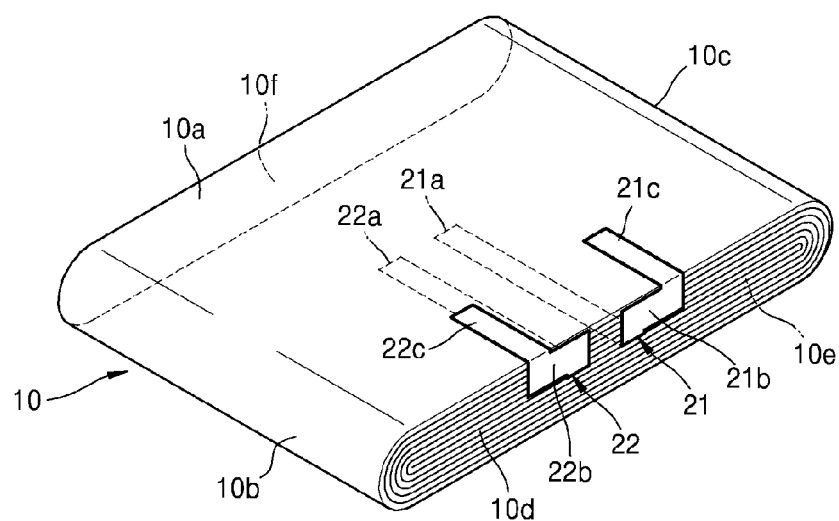

Furthermore, referring to FIG. 14, portions of the first and second electrode tabs 21 and 22 buried in the electrode jelly-roll 10 and portions of the first and second electrode tabs 21 and 22 facing an outer surface of the electrode jelly-roll 10 may not overlap each other. For example, the first and second electrode tabs 21 and 22 may include first tab portions 21a and 22a buried in the electrode jelly-roll 10, second tab portions 21b and 22b facing the first side surface 10d of the electrode jelly-roll 10, and third tab portions 21c and 22c facing an outer surface of the electrode jelly-roll 10. Here, the first tab portions 21a and 22a and the third tab portions 21c and 22c may extend in the winding axis direction, whereas the second tab portions 21b and 22b may extend in directions perpendicular to the winding axis, such that the first tab portions 21a and 22a and the third tab portions 21c and 22c do not overlap each other. As a result, the electrode assembly 100 may be prevented from having an excessive thickness at the portions where the first and second electrode tabs 21 and 22 are disposed. Although FIG. 14 shows that both the second tab portions 21b and 22b face the same first side surface 10d, if the first electrode tab 21 is led out from the first side surface 10d and the second electrode tab 22 is led out from the second side surface 10f, the second tab portions 21b and 22b may face the side surfaces 10d and 10f opposite to each other, respectively. Furthermore, instead of disposing both the third tab portions 21c and 22c on the top surface 10a, the third tab portion 21c of the first electrode tab 21 may be disposed on the top surface 10a, whereas the third tab portion 22c of the second electrode tab 22 may be disposed on the bottom surface 10e.

Figure 15:
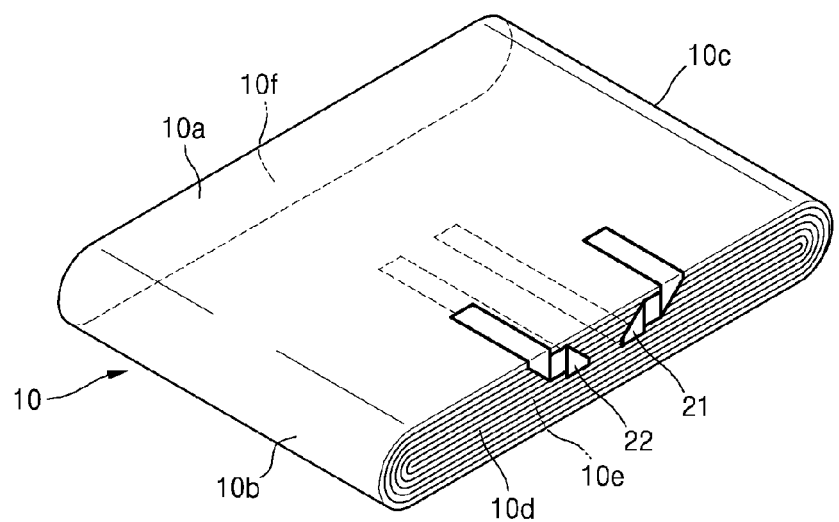

Although the overall shapes of the first and second electrode tabs 21 and 22 shown in FIG. 14 are not linear shapes, the same effect as that of the structure shown in FIG. 14 may be obtained from the first and second electrode tabs 21 and 22 having linear shapes. For example, as shown in FIG. 15, portions of the first and second electrode tabs 21 and 22 having linear shapes facing the first side surface 10d may be successively folded by 90 degrees, such that the first tab portions 21a and 22a and the third tab portions 21c and 22c do not overlap each other.

Figure 16:
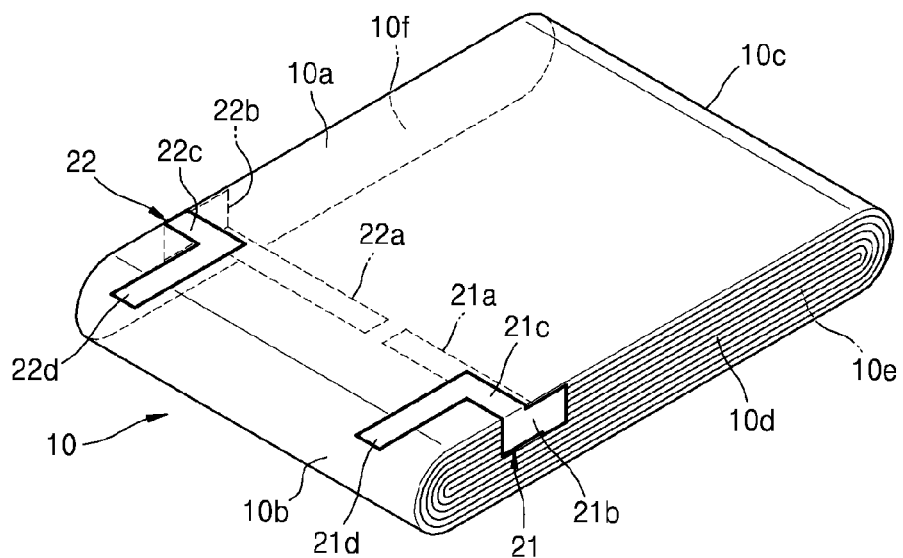

Furthermore, referring to FIG. 16, the first and second electrode tabs 21 and 22 may further include fourth tab portions 21d and 22d which extend from the third tab portions 21c and 22c in a direction perpendicular to the winding axis. The fourth tab portions 21d and 22d may extend in a direction parallel to an outer surface of the electrode jelly-roll 10, e.g., the top surface 10a. The fourth tab portions 21d and 22d may pass through the curved surface 10b of the electrode jelly-roll 10 and protrude out of the electrode jelly-roll 10.

Figure 17:
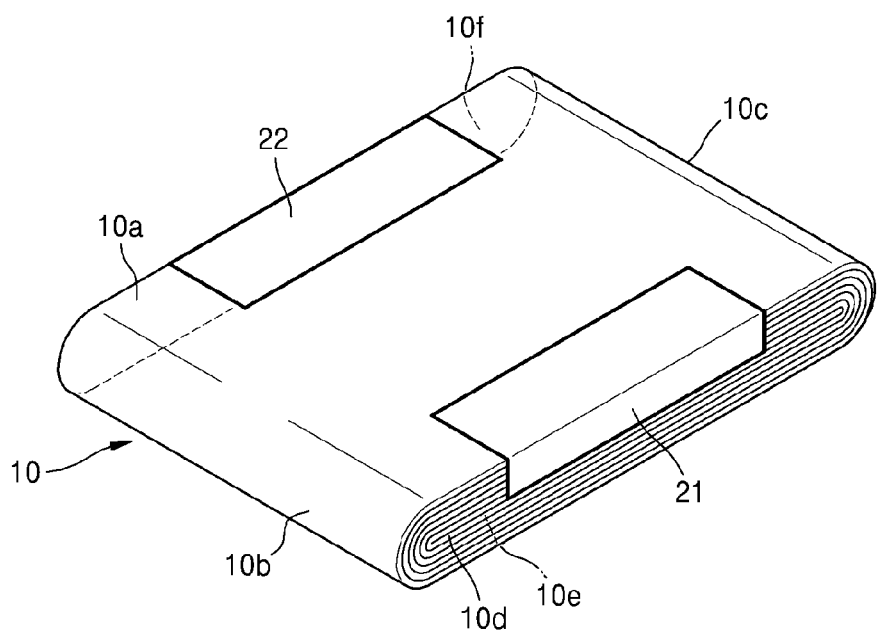
Figure 18:
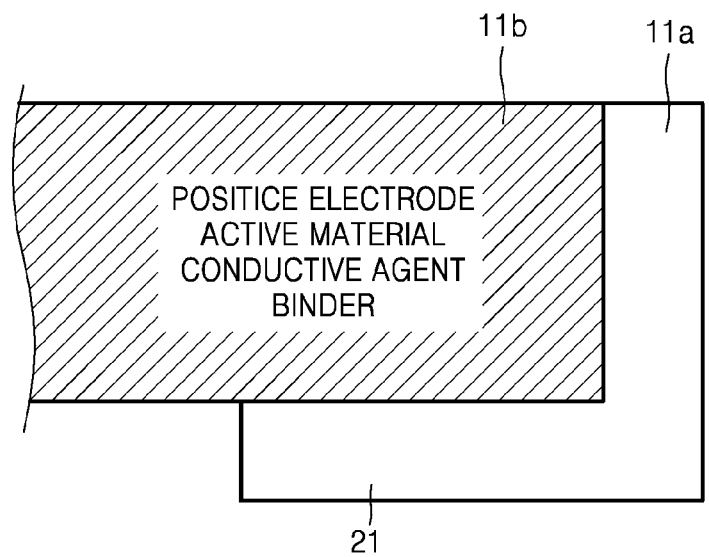
FIGS. 18 through 20 show schematic configurations of portions of an embodiment of a positive electrode plate and an embodiment of a negative electrode plate used in the electrode jelly-roll of FIG. 17.
Figure 19:
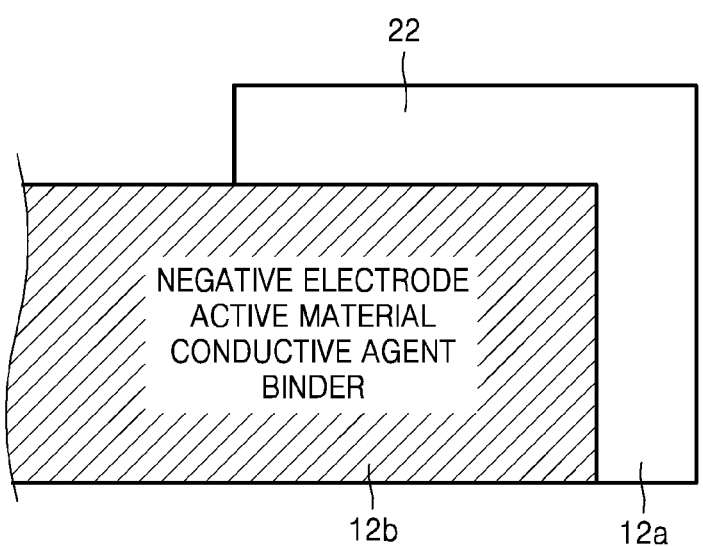

FIG. 17 shows an example in which the first and second electrode tabs 21 and 22 are integrated with the first electrode plate 11 and the second electrode plate 12, respectively, used in the electrode jelly-roll 10. FIGS. 18 and 19 are schematic diagrams showing configurations of the electrode plates 11 and 12 and the electrode tabs 21 and 22 used in the electrode jelly-roll 10 of the FIG. 17.

First, referring to FIG. 18, the first electrode plate 11 may be a positive electrode. In this case, the first electrode plate 11 may include the current collector 11a, which extends in a direction and functions as a substrate, and the positive active material 11b, which is disposed on the current collector 11a. The positive active material 11b may contain a conductive agent and a binder. As shown in FIG. 18, the first electrode tab 21 may be a portion of the current collector 11a, the portion protruding and extending in a direction perpendicular to the lengthwise direction of the current collector 11a. The first electrode tab 21 may protrude from an end portion on which the positive active material 11b is not disposed (that is, a positive active material non-coated portion). In the same regard, as shown in FIG. 19, the second electrode plate 12 may be a portion of the current collector 12a, the portion protruding and extending in a direction perpendicular to the lengthwise direction of the current collector 12a. The first electrode tab 22 may protrude from an end portion on which the negative active material 12b is not disposed (that is, a negative active material non-coated portion).

Figure 20:
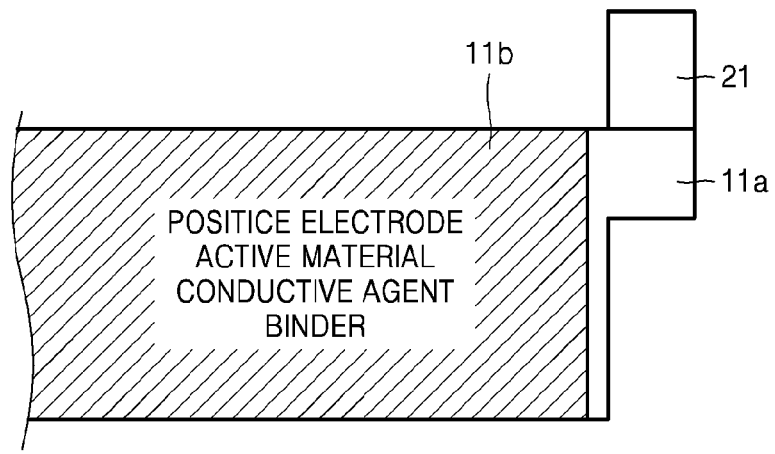

Furthermore, as shown in FIG. 20, the first electrode tab 21 may be formed by cutting a portion of the positive active material non-coated portion of the first current collector 11a and bending the cut portion of the positive active material non-coated portion to protrude in a direction perpendicular to the lengthwise direction of the first current collector 11a. Although not shown, the second electrode tab 22 may be similarly formed from the second current collector 12a in the same regard as shown in FIG. 20. In other words, the second electrode tab 22 may be formed by cutting a portion of the negative active material non-coated portion of the second current collector 12a and bending the cut portion of the negative active material non-coated portion to protrude in a direction perpendicular to the lengthwise direction of the second current collector 12a.

Figure 21:
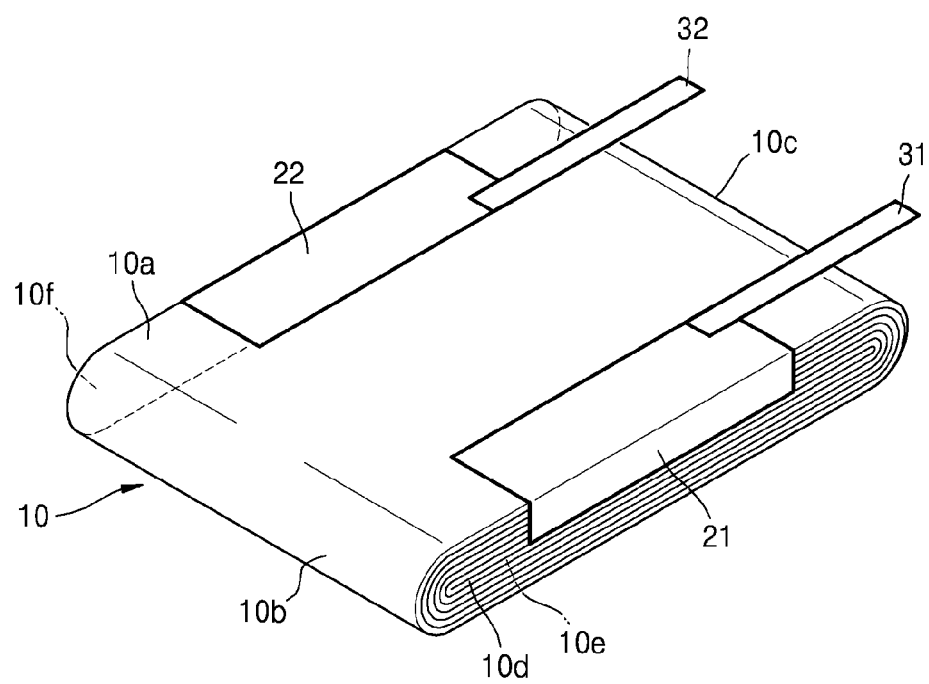

Also, referring to FIG. 21, an electrode assembly according to an example embodiment may further include a first wiring 31, which is electrically connected to the first electrode tab 21, and a second wiring 32, which is electrically connected to the second electrode tab 22. Here, the first and second wirings 31 and 32 may each extend in a direction perpendicular to the winding axis, for example. However, the present embodiment is not limited thereto. Although FIG. 21 shows that the first and second wirings 31 and 32 extend toward the right curved surface 10c, the first and second wirings 31 and 32 may extend toward the left curved surface 10b. Furthermore, although FIG. 21 shows the electrode assembly according to the embodiment as shown in FIG. 17, the first and second wirings 31 and 32 may be disposed in electrode assemblies according to other embodiments. The first and second wirings 31 and 32 may be formed to have a long and flat sheet-like shape. For example, a width of the first and second wirings 31 and 32 may be 10 times or greater than a thickness thereof, e.g., from about 50 times to about 10000 times. The sheet-like first and second wirings 31 and 32 may be useful for flexibly connecting a plurality of prismatic electrode jelly-rolls 10. Furthermore, the first and second wirings 31 and 32 may comprise at least one of aluminum, copper, stainless steel, and nickel. Particularly, the first wiring 31 connected to a positive electrode may comprise aluminum or stainless steel, whereas the second wiring 32 connected to a negative electrode may comprise at least one of copper, stainless steel, and nickel. The materials for forming the first and second wirings 31 and 32 may also be used to form the first and second electrode tabs 21 and 22.

Figure 22:
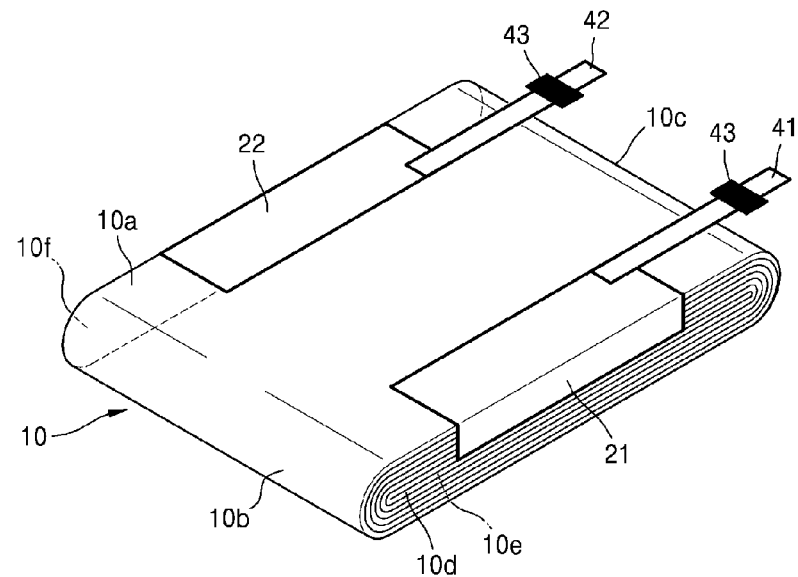

Furthermore, as shown in FIG. 22, an electrode assembly according to an example embodiment may include lead tabs 41 and 42 instead of the first and second wirings 31 and 32. In other words, the electrode assembly may further include a first lead tab 41, which is electrically connected to the first electrode tab 21, and a second lead tab 42, which is electrically connected to the second electrode tab 22. Here, the lead tabs 41 and 42 may each extend in a direction perpendicular to the winding axis, for example. However, the present embodiment is not limited thereto. The lead tabs 41 and 42 may connect electrode terminals of a secondary battery to the first and second electrode tabs 21 and 22 when the secondary battery is formed by disposing, e.g., packaging, the electrode assembly in an outer casing, such as a pouch. A thermoplastic material 43, such as polypropylene ("PP"), may be attached to portions of the lead tabs 41 and 42 to seal the electrode assembly by being combined with an outer casing. However, the first and second electrode tabs 21 and 22 may function as lead tabs without arranging the lead tabs 41 and 42. For example, the thermoplastic materials 43 may be attached to portions of the first and second electrode tabs 21 and 22 nearby end portions of the first and second electrode tabs 21 and 22, such that the first and second electrode tabs 21 and 22 function as lead tabs.

Figure 23:
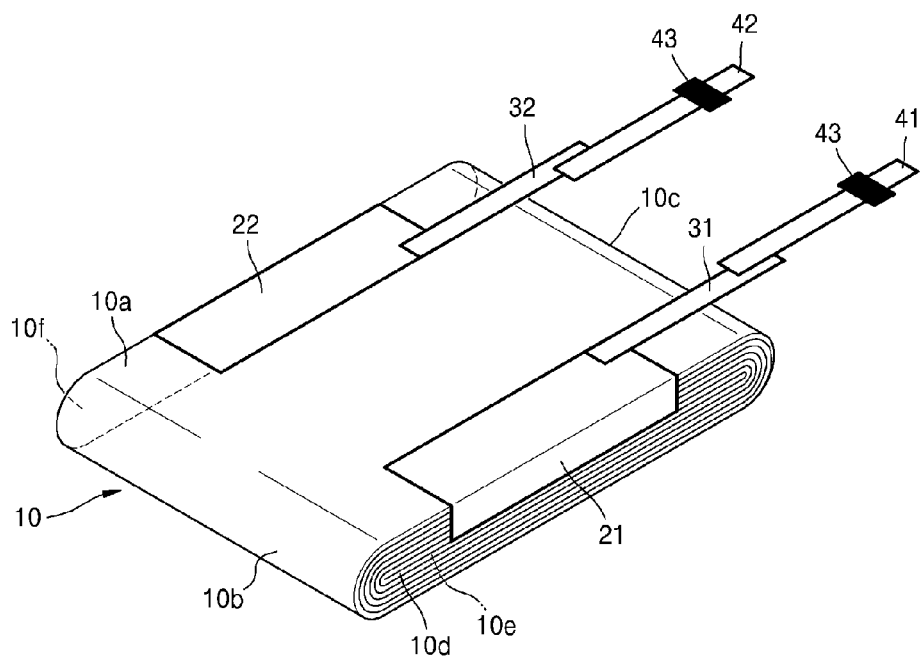

Furthermore, as shown in FIG. 23, an electrode assembly according to another embodiment may include both the first and second wirings 31 and 32 and the lead tabs 41 and 42. For example, the electrode assembly may include the first wiring 31, which is electrically connected to the first electrode tab 21, the second wiring 32, which is electrically connected to the second electrode tab 22, the first lead tab 41, which is electrically connected to the first wiring 31, and the second lead tab 42, which is electrically connected to the second wiring 32. Here, the first and second wirings 31 and 32 and the first and second lead tabs 41 and 42 may extend in directions perpendicular to the winding axis, for example. However, the present embodiment is not limited thereto.

Also, without using the first and second electrode tabs 21 and 22, the electrode plates 11 and 12 as shown in FIGS. 2 and 3 may function as the first and second electrode tabs 21 and 22. For example, referring to FIG. 24, an electrode assembly according to an example embodiment may include the electrode jelly-roll 10, which is formed by winding the first electrode plate 11, the second electrode plate 12, and a separator 13 interposed between the first electrode plate 11 and the second electrode plate 12 together. Here, an end portion of the current collector 11a, which does not contact the positive active material 11b and is exposed to outside the electrode jelly-roll 10, may function as the first electrode tab 21. In the same regard, an end portion of the current collector 12a, which does not contact the negative active material 12b and is exposed to outside the electrode jelly-roll 10, may function as the second electrode tab 22.

Figure 24:
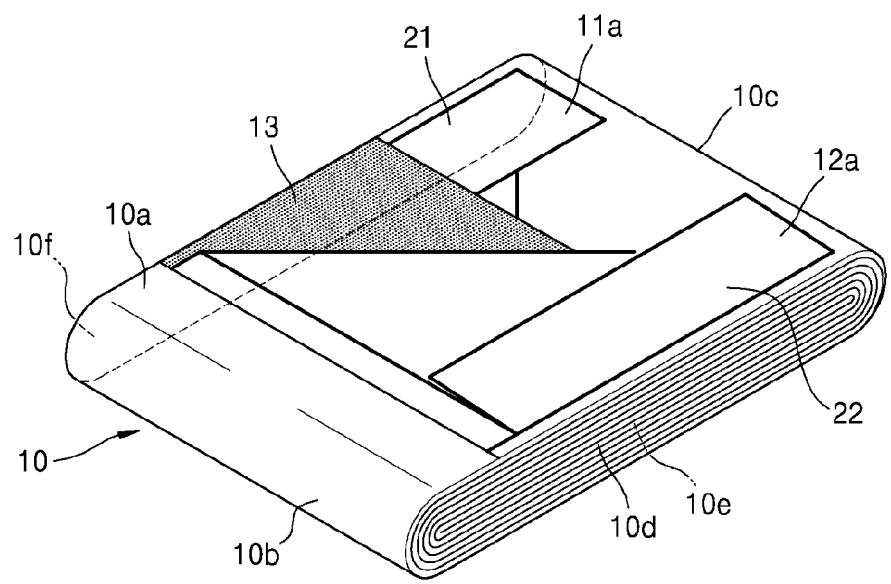

In other words, in the embodiment shown in FIG. 24, the first electrode tab 21 is an exposed end portion of an active material non-coated portion of the first current collector 11a that is disposed to face an outer surface of the electrode jelly-roll 10, whereas the second electrode tab 22 is an exposed end portion of an active material non-coated portion of the second current collector 12a that is disposed to face an outer surface of the electrode jelly-roll 10. Here, the end portion of the first current collector 11a and the end portion of the second current collector 12a exposed to outside the electrode jelly-roll 10 may be bent in predetermined shapes. For example, as shown in FIG. 24, since the end portion of the first current collector 11a and the end portion of the second current collector 12a are bent by 90 degrees in a winding axis direction of the electrode jelly-roll 10, the end portion of the first current collector 11a and the end portion of the second current collector 12a may function as the first electrode tab 21 and the second electrode tab 22, which are led out in winding axis direction, respectively. Furthermore, referring to FIG. 24, portions of the end portion of the first current collector 11a and the end portion of the second current collector 12a, which are bent in winding axis direction of the electrode jelly-roll 10, are bent by about 180 degrees in a direction opposite to the lead out direction.

Figure 25:
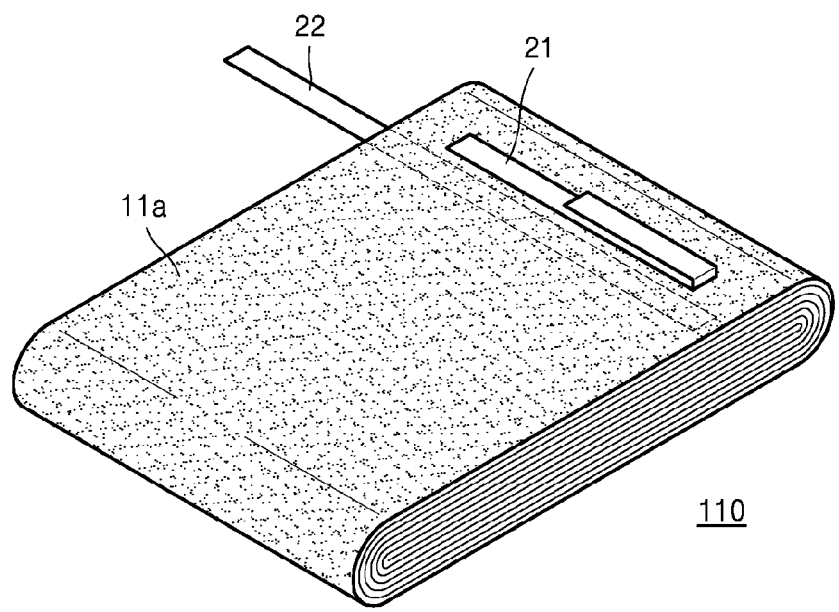

Furthermore, referring to FIG. 25, the first current collector 11a may form an outer surface of the electrode jelly-roll 10. For example, the electrode assembly 110 as shown in FIG. 25 may include the electrode jelly-roll 10 which is formed by winding the first electrode plate 11, the second electrode plate 12, and a separator 13 interposed between the first electrode plate 11 and the second electrode plate 12 together, wherein the first electrode tab 21 is electrically connected to the first electrode plate 11 and is disposed on an outer surface of the electrode jelly-roll 10, and the second electrode tab 22 is electrically connected to the second electrode plate 12 and is led out in a direction parallel the winding axis of the electrode jelly-roll 10. Here, an end portion, which is an active material non-coated portion of the current collector 11a, which does not contact the positive active material 11b and is exposed to outside the electrode jelly-roll 10, may surround outer surfaces of the electrode jelly-roll 10. In this case, a portion of the second electrode tab 22 may be buried in the electrode jelly-roll 10 and led out from inside of the electrode jelly-roll 10, whereas the first electrode tab 21 may be formed on the end portion of the active material non-coated portion of the current collector 11a exposed to outside. As shown in FIG. 25, the first electrode tab 21 and the second electrode tab 22 may be led out in winding axis direction of the electrode jelly-roll 10. Although FIG. 25 shows that only the first electrode tab 21 is bent in a direction opposite to the lead out direction, the second electrode tab 22 may also be bent in a direction opposite to the lead out direction.

Figure 26A:
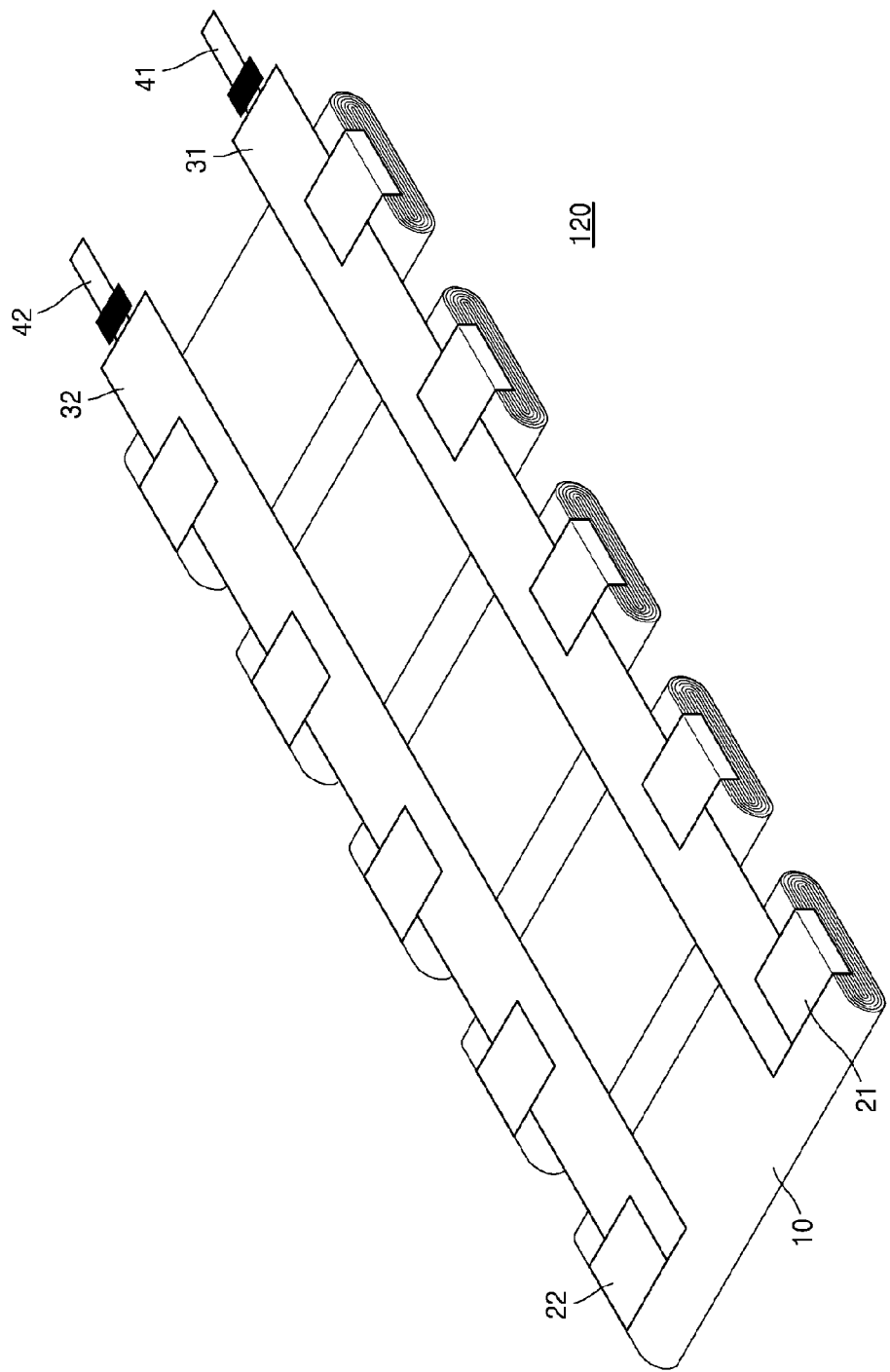
FIGS. 26A and 26B are schematic perspective views of another embodiment of an electrode assembly, in which a plurality of prismatic electrode jelly-rolls are connected in parallel.
Figure 26B:
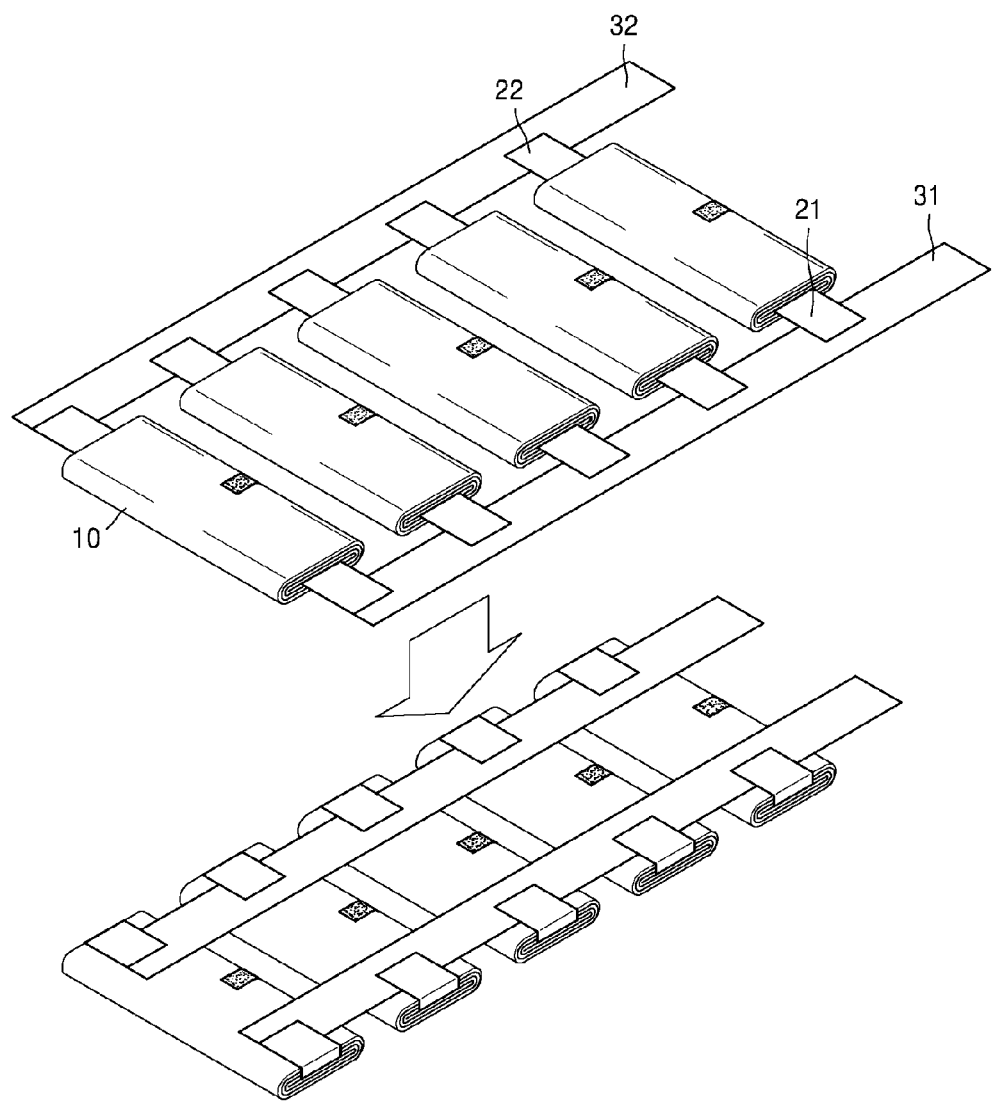

FIGS. 26A and 26B are schematic perspective views of an electrode assembly 120 according to another embodiment, in which the plurality of prismatic electrode jelly-rolls 10 is connected in parallel. Referring to FIG. 26A, the electrode assembly 120 may include the plurality of prismatic electrode jelly-rolls 10 and the plurality of first and second electrode tabs 21 and 22 that are disposed in the plurality of prismatic electrode jelly-rolls 10, respectively. For example, the plurality of prismatic electrode jelly-rolls 10 may be electrically connected in parallel via the first and second wirings 31 and 32. To this end, the first wiring 31 extending in a direction perpendicular to the winding axis may be electrically connected to the plurality of first electrode tabs 21, whereas the second wiring 32 extending in a direction perpendicular to the winding axis may be electrically connected to the plurality of second wirings 32. In an embodiment, a single first wiring 31 and/or a single second wiring 32 may be used. Furthermore, the first lead tab 41 and the second lead tab 42 may be connected to the first wiring 31 and the second wiring 32, respectively.

The connections between the first and second electrode tabs 21 and 22 and the first and second wirings 31 and 32 may be established before the first and second electrode tabs 21 and 22 are bent onto an outer surface of the electrode jelly-roll 10 as shown in FIG. 26B. For example, after the first and second wirings 31 and 32 are connected to the first and second electrode tabs 21 and 22 which are led out from the electrode jelly-roll 10 in winding axis direction, the first and second wirings 31 and 32 are attached to an outer surface of the electrode jelly-roll 10, thereby naturally bending the first and second electrode tabs 21 and 22.

Figure 27:
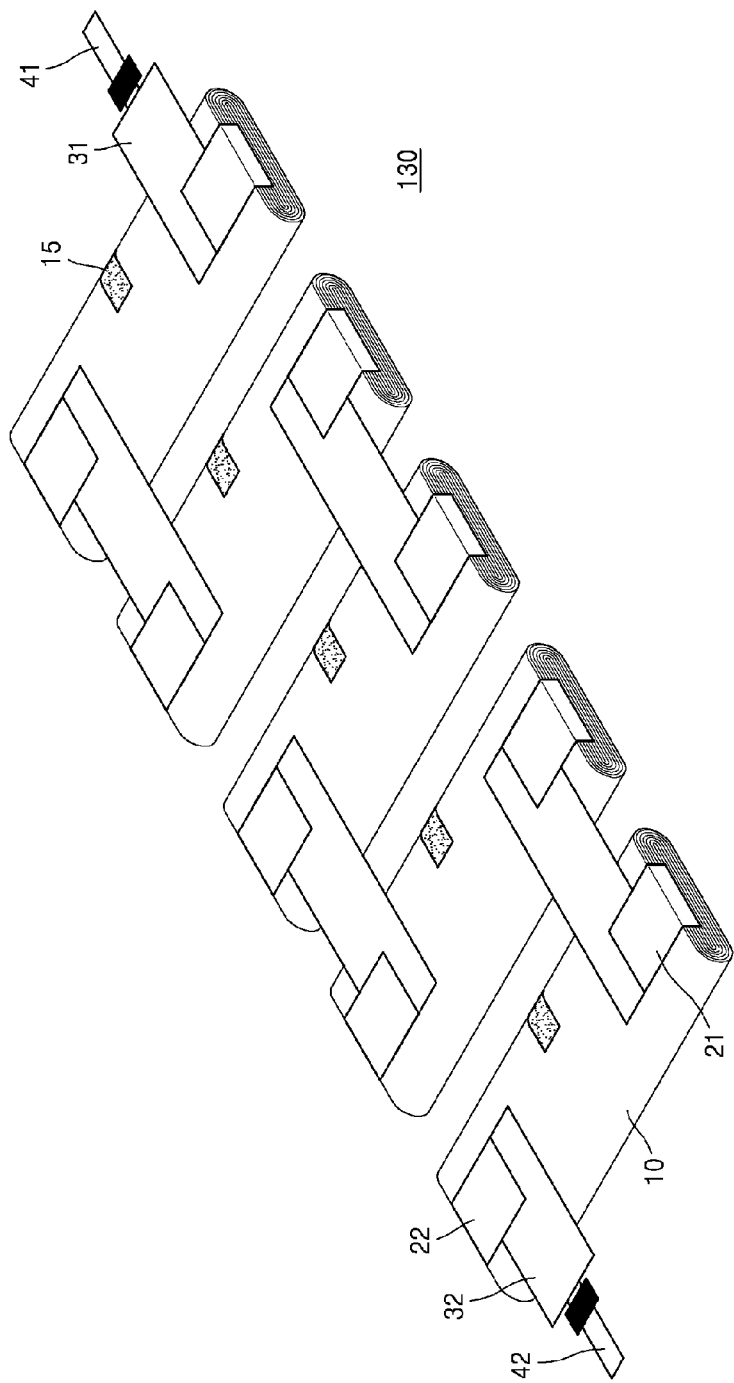
FIG. 27 is a schematic perspective view of another embodiment of an electrode assembly, in which a plurality of prismatic electrode jelly-rolls are connected in series.

Furthermore, the plurality of prismatic electrode jelly-rolls 10 may be electrically connected in series via the plurality of wirings 31 and 32. Referring to FIG. 27, an electrode assembly 130 may include a plurality of prismatic electrode jelly-rolls 10 that are electrically connected in series. A pair of the first and second electrode tabs 21 and 22 may be disposed at each of the plurality of prismatic electrode jelly-rolls 10, and the plurality of first and second wirings 31 and 32 may electrically interconnect the electrode tabs 21 and 22 of the two prismatic electrode jelly-rolls 10 adjacent to each other. For example, the first wiring 31 may electrically interconnect the first electrode tabs 21 of adjacent prismatic electrode jelly-rolls 10. Furthermore, the second wiring 32 may interconnect the second electrode tabs 22 of adjacent prismatic electrode jelly-rolls 10. Here, the interconnection between the first electrode tabs 21 via the first wiring 31 and the interconnection between the second electrode tabs 22 via the second wiring 32 may be alternately disposed.

According to the embodiments as shown in FIGS. 26A and 27, since reliability of electric connections between the plurality of prismatic electrode jelly-rolls 10 is improved, a flexible battery with improved reliability and durability may be provided. Such a flexible battery may be bent and have a high energy density. Furthermore, since electric connection between the plurality of prismatic electrode jelly-rolls 10 is simple, production of large-capacity batteries may be simplified and manufacturing cost thereof may be reduced.

Figure 28:
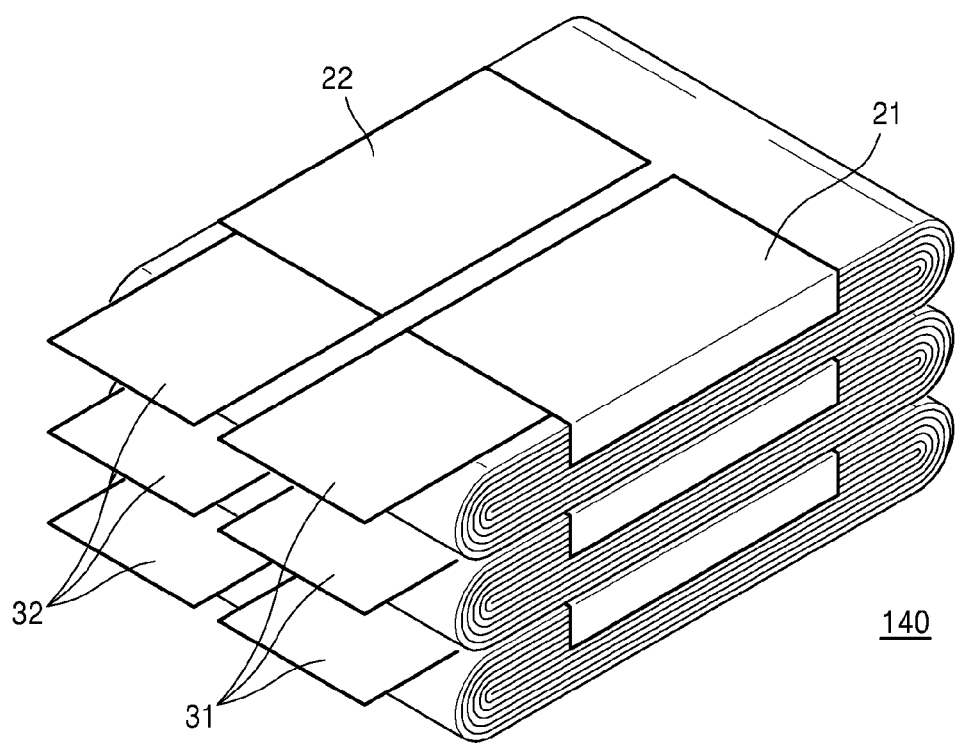
FIG. 28 is a schematic perspective view of another embodiment of an electrode assembly, in which a plurality of prismatic electrode jelly-rolls are stacked and connected in series.

Furthermore, the electrode assemblies as shown in FIG. 21 may be stacked to overlap one another. For example, referring to FIG. 28, an electrode assembly 140 may include the plurality of stacked prismatic electrode jelly-rolls 10, the plurality of first and second electrode tabs 21 and 22 respectively disposed on each jelly-roll of the plurality of prismatic electrode jelly-rolls 10, and the plurality of first and second wirings 31 and 32 may be electrically and respectively connected to each electrode tab of the plurality of first and second electrode tabs 21 and 22.

Figure 29:
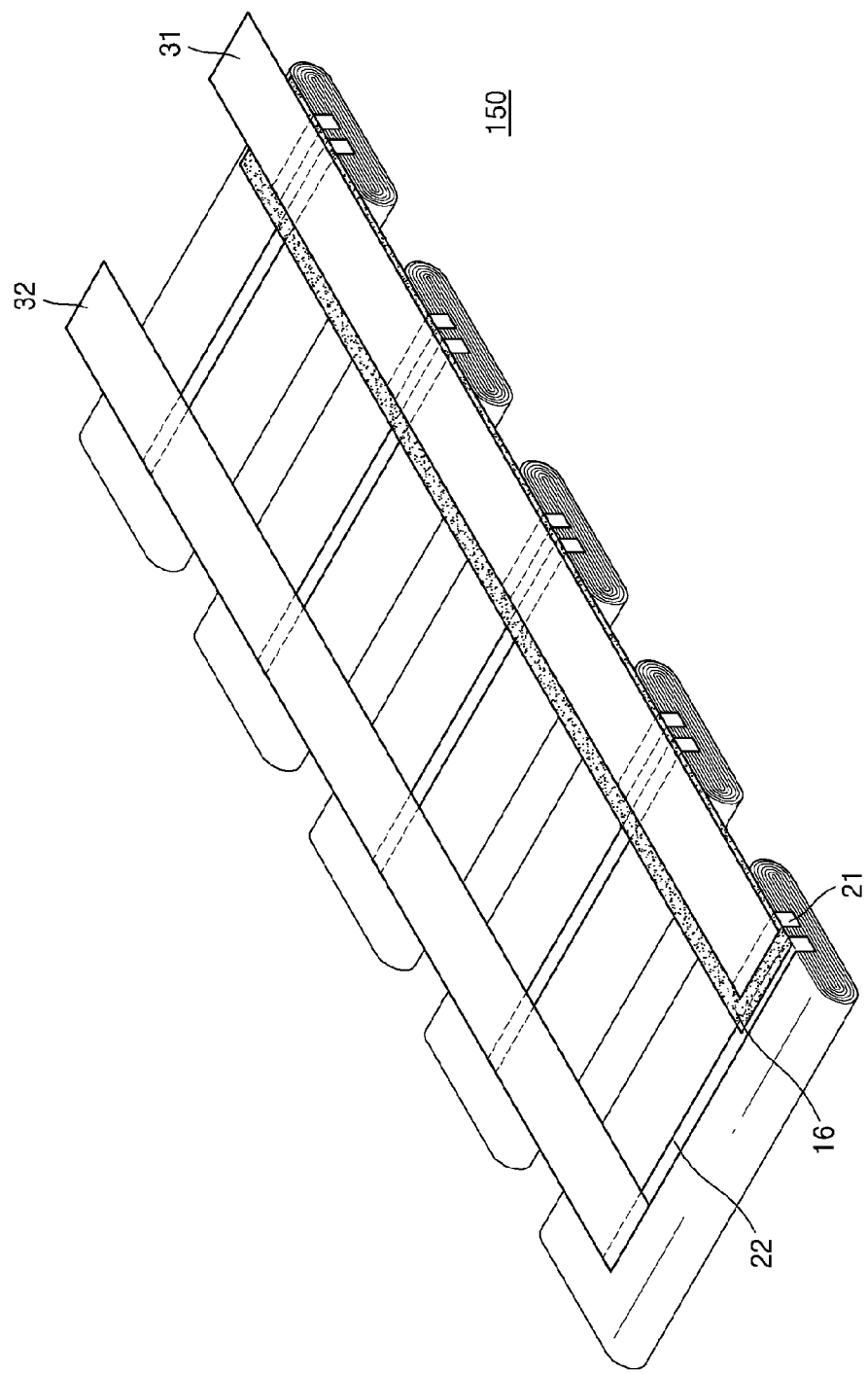
FIGS. 29 through 31 are schematic perspective views of other embodiments of electrode assemblies.

FIG. 26A shows an embodiment in which the first and second electrode tabs 21 and 22 are led out from two opposite side surfaces 10d and 10f of the electrode jelly-roll 10, respectively. However, even if the first and second electrode tabs 21 and 22 are led out from the same side surface 10d of the electrode jelly-roll 10, the plurality of prismatic electrode jelly-rolls 10 may be connected. Referring to FIG. 29, an electrode assembly 150 may include the plurality of prismatic electrode jelly-rolls 10, the electrode tabs 21 and 22 of the plurality of first and second electrode tabs 21 and 22 having different lengths, and an insulation film 16 disposed to cover portions of the plurality of second electrode tabs 22. For example, the second electrode tab 22 may be longer than the first electrode tab 21. The insulation film 16 may cover the second electrode tabs 22 except its end portions. The first electrode tabs 21 may be disposed on the insulation film 16. Next, the first wiring 31 may be disposed on the first electrode tab 21 and the insulation film 16, whereas the second wiring 32 may be disposed on the end portions of the second electrode tab 22. As a result, the first wiring 31 may be connected to the first electrode tab 21 and the second wiring 32 may be connected to the second electrode tabs 22 without a short circuit between a positive electrode and negative electrode.

Figure 30:
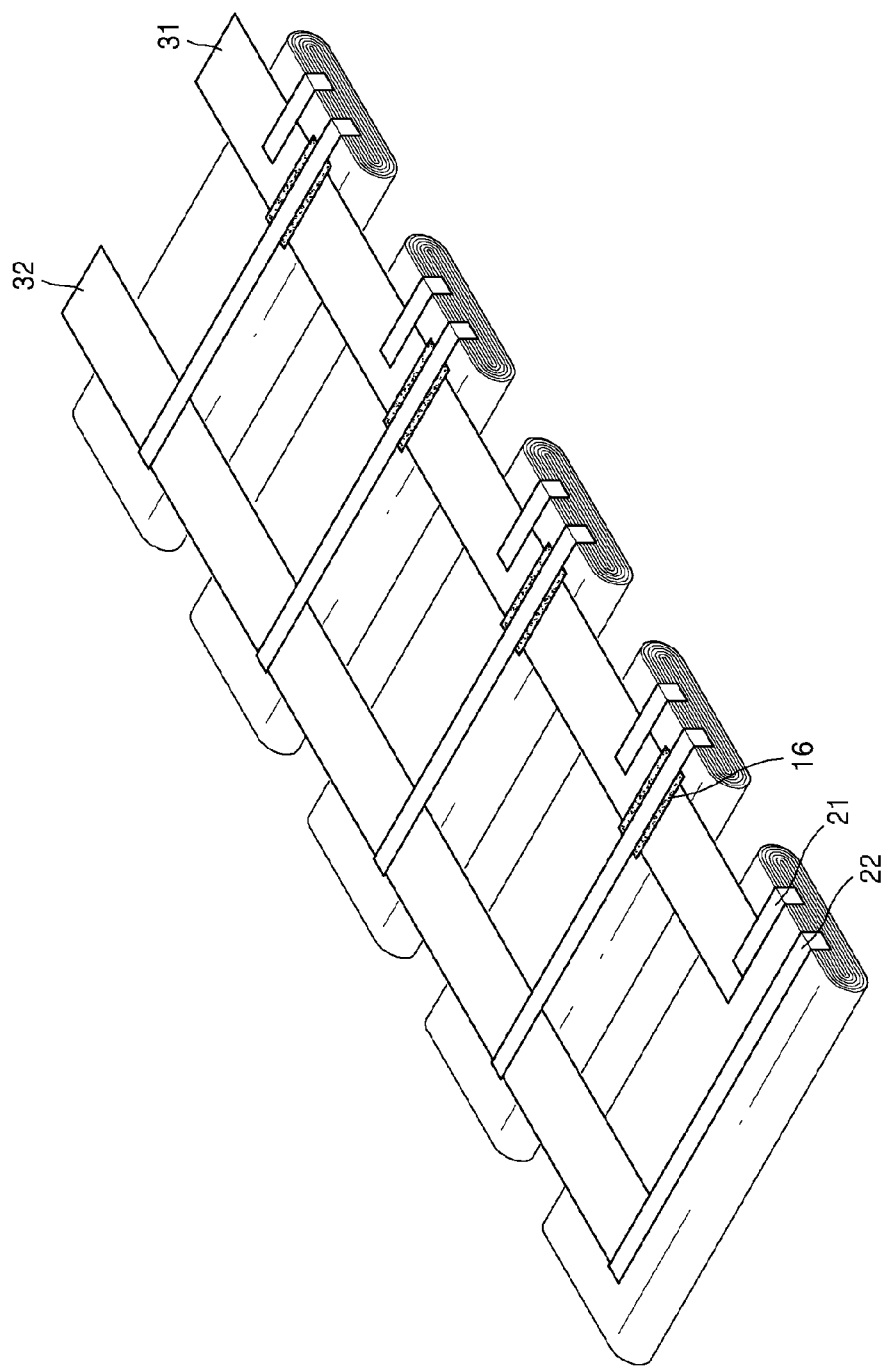

Furthermore, referring to FIG. 30, an electrode assembly may include the plurality of prismatic electrode jelly-rolls 10, the plurality of first and second electrode tabs 21 and 22, which are led out from the same side surface 10d of the electrode jelly-roll 10 and have different lengths, the first wiring 31 connected to the first electrode tabs 21, the second wiring 32 connected to the second electrode tabs 22, and a plurality of insulation films 16 disposed between the second electrode tab 22 and the first wiring 31, respectively. As shown in FIG. 30, the first wiring 31 and the second wiring 32 may be disposed on the plurality of prismatic electrode jelly-rolls 10. Next, the second electrode tabs 22, which are longer than the first electrode tabs 21, may extend beyond the first wiring 31 and may be connected to the second wiring 32, whereas the first electrode tabs 21, which are shorter than the second electrode tabs 22, may be connected to the first wiring 31. Here, to prevent an electrical short circuit between the second electrode tabs 22 and the first wiring 31, the insulation films 16 may be disposed between the second electrode tabs 22 and the first wiring 31. Furthermore, the length of the first wiring 31 may be smaller than that of the second wiring 32. As a result, the first wiring 31 contacts only the first electrode tab 21 and does not overlap the second electrode tab 22 on the leftmost electrode jelly-roll 10 in FIG. 30, thus arrangement of the insulation film 16 on the leftmost electrode jelly-roll 10 can be omitted. Also, although FIG. 30 shows that the second wiring 32 is disposed below the second electrode tab 22, the second wiring 32 may be disposed on the second electrode tab 22 by disposing the second electrode tab 22 first and arranging the second wiring 32 later. Furthermore, the first electrode tabs 21 may be disposed below the first wiring 31.

Figure 31:
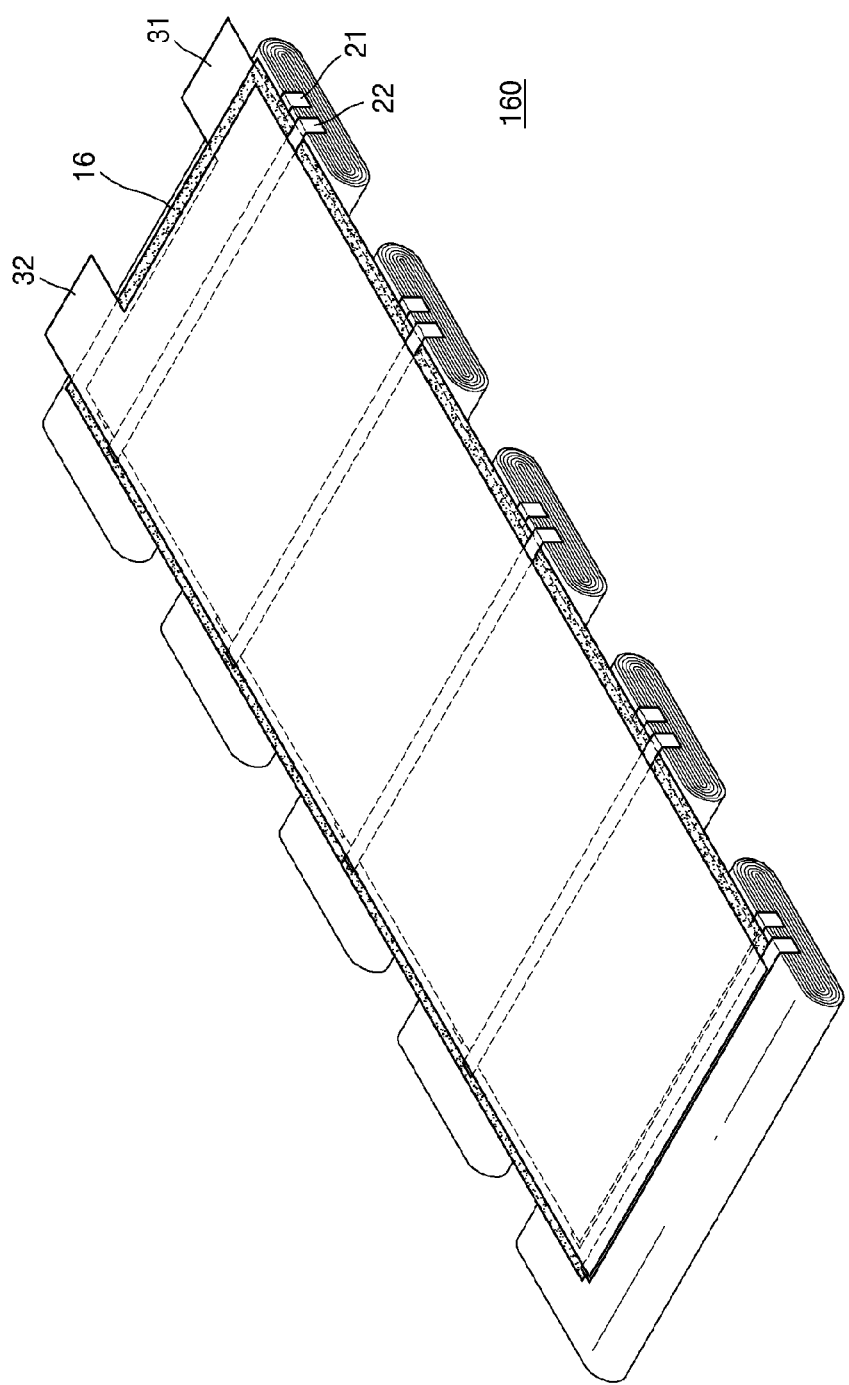

Furthermore, an electrode assembly 160 as shown in FIG. 31 may include the plurality of prismatic electrode jelly-rolls 10, the plurality of first and second electrode tabs 21 and 22, and the insulation film 16 disposed to cover the plurality of first electrode tabs 21. According to the present embodiment, the insulation film 16 may be disposed to completely cover the plurality of first electrode tabs 21 and the first wiring 31 connected to the plurality of first electrode tabs 21. The plurality of second electrode tabs 22 and the second wiring 32 connected to the second electrode tabs 22 may be disposed on the insulation film 16. In this case, length of the first electrode tab 21 may be same as or different from that of the second electrode tab 22. Furthermore, a width of the first wiring 31 and a width of the second wiring 32 may be similar to that of the electrode jelly-roll 10. The width of the insulation film 16 may be greater than a width of the first wiring 31 and the second wiring 32.

Figure 32:
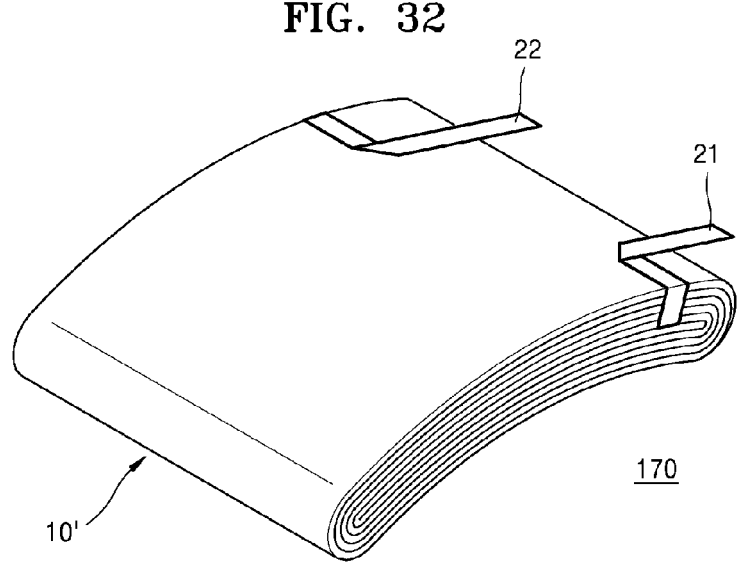
FIG. 32 is a schematic perspective view of another embodiment of an electrode assembly including a curved electrode jelly-roll.

FIG. 32 is a schematic perspective view of an electrode assembly 170 according to another embodiment including a curved electrode jelly-roll 10'. Referring to FIG. 32, the curved electrode jelly-roll 10' may include the top surface 10a and the bottom surface 10e which are parallel to the winding axis, the side surfaces 10d and 10f which perpendicular to the winding axis and face each other, and the two curved surfaces 10b and 10c between the top surface 10a and the bottom surface 10e. Here, distances between the top surface 10a and the bottom surface 10e are substantially constant, and the top surface 10a and the bottom surface 10e may be curved. As shown in FIG. 32, the axis based on which the top surface 10a and the bottom surface 10e are curved may be parallel to the winding axis of the curved electrode jelly-roll 10'. Therefore, stresses at portions at which the first and second electrode tabs 21 and 22 are connected to the electrode plates 11 and 12 are limited. The curved electrode jelly-roll 10' may be formed to have a curved surface by winding a first electrode plate, a second electrode plate, and a separator interposed between the first electrode plate and the second electrode plate together and press-deforming the wound structure using a tool having a curved shape.

Figure 33:
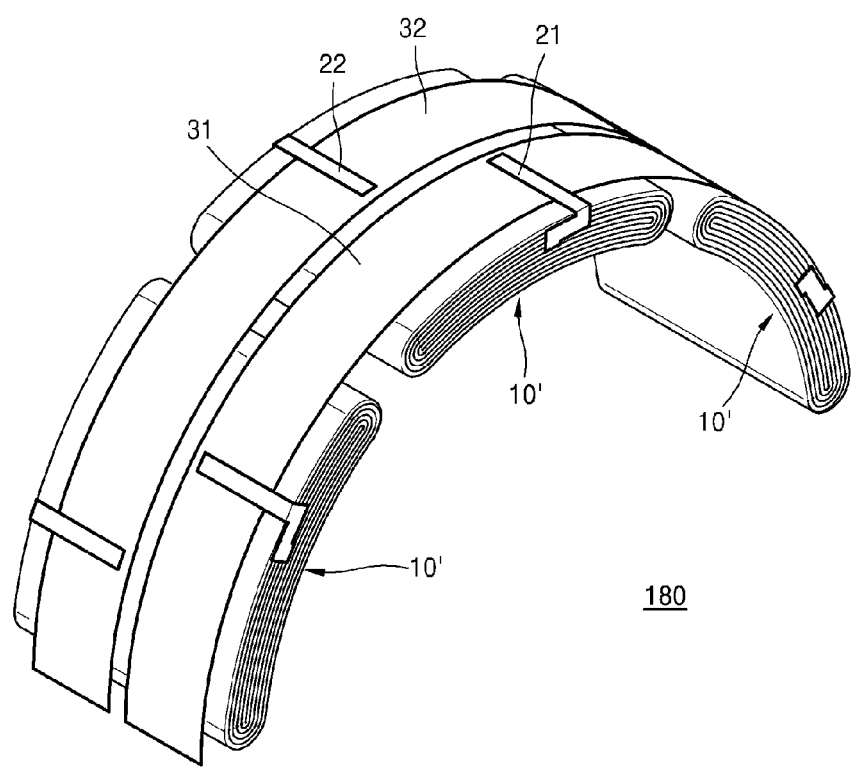
FIG. 33 is a schematic perspective view of another embodiment of an electrode assembly, in which a plurality of curved electrode jelly-rolls are connected in parallel.

FIG. 33 is a schematic perspective view of an electrode assembly 180 according to another embodiment, in which the plurality of curved electrode jelly-rolls 10' is connected in parallel. Although FIG. 33 shows the curved electrode jelly-rolls 10' only, the flat prismatic electrode jelly-rolls 10 and the curved electrode jelly-rolls 10' may be mixed as an occasion demands. By using the electrode assembly 190 as shown in FIG. 33, a battery having complex curved surfaces may be provided, and such a battery may be used as a power supply for a wearable device. For example, a curved and bendable battery may be provided as a battery to wear on a wrist.

The electrode assemblies 100, 110, 120, 130, 140, 150, 160, 170, and 180 according to the embodiments are described above. The electrode assemblies 100, 110, 120, 130, 140, 150, 160, 170, and 180 described above may be applied to power supplies for shape-sensitive electronic devices like mobile devices (e.g., mobile phones, smart phones, tablet PCs, laptop PCs, e-book terminals, and remote controllers), flexible electronic devices (e.g., flexible smart phones, unbreakable smart phones, flexible tablet PCs, e-book terminals, or wearable devices), or automobile batteries or power storage devices in which efficient space utilization regarding battery-related system is demanded. Hereinafter, exemplary embodiments of the electrode assemblies 100, 110, 120, 130, 140, 150, 160, 170, and 180 as described above will be disclosed.

EXAMPLES

Example 1

LiCoO$_2$ was used as a positive active material, polyvinylidene fluoride ("PVDF") was used as a binder, and carbon was used as a conductor, where a material for forming a positive active material layer was fabricated by mixing the above-stated materials at a weight ratio of 92:4:4 in the order stated and dispersing the mixture into N-methyl-2-pyrrolidone. The material for forming a positive active material layer was coated to both surfaces of an aluminum foil having a thickness of 13.5 micrometers (μm), and a positive electrode was fabricated by drying and pressing the coated aluminum foil.

Graphite was used as negative active material, a styrene-butadiene rubber ("SBR") was used as first binder, and carboxymethyl cellulose ("CMC") was used as a second binder, where a material for forming a negative active material layer was fabricated by mixing the above-stated materials at the weight ratios of 98:1:1 in the order stated and dispersing the mixture into the water. The material for forming a negative active material layer was coated to both surfaces of an aluminum foil having a thickness of 8 μm, and a negative electrode was fabricated by drying and pressing the coated aluminum foil.

The electrode jelly-roll 10 was fabricated by interposing a polyethylene separator between the positive electrode and the negative electrode fabricated as described above. Metal foil current collectors and electrode tabs of the positive electrode and the negative electrode were disposed in parallel to the winding axis by welding the same at the center of the electrode jelly-roll 10 at which the electrode jelly-roll 10 started to be wound, and, after the electrode jelly-roll 10 was wound, the outermost end portions of the electrode jelly-roll 10 were fixed using adhesive tape. Next, electrode tabs of the positive electrode and the negative electrode protruding in opposite directions were bent by about 180 degrees to closely contact outer surfaces. Furthermore, the electrode tabs of the positive electrode and the negative electrode were folded again, such that the end portions of the electrode tabs faced curved surfaces. Here, the electrode assembly was fabricated, such that the greatest distance between the two opposite curved surfaces of the electrode jelly-roll 10 is to be about 40 mm and a distance between opposite side surfaces facing each other is about 20 mm.

Also, an electrolyte was fabricated by dissolving $LiPF_6$ having a concentration about 1.3 molar (M) into a mixture in which ethylene carbonate ("EC") and diethyl carbonate ("DEC") were mixed at the volume ratio of 3:7. A laminate battery was manufactured by surrounding the electrode assembly with a pouch (product D-EL35H from Dai Nippon Printing ("DNP," Japan); the same pouch was used in all embodiments and comparative embodiments described below), injecting the electrolyte thereinto, and vacuum sealing the pouch. Without tabs protruding to the outside, the length of the completed battery was 49.5 mm, the width was 24.0 mm, the greatest thickness was 2.78 mm, the measured discharge energy was about 822 milliwatt-hours (mWh), and the energy density was about 249 watt-hours per liter (Wh/l) (based on a cube-type battery).

Example 2: Second Embodiment

The battery according to the first embodiment was curved to have a curved surface with an inner curvature radio of 50 mm. Measured discharge energy of the same was about 835 mWh.

Comparative Example 1

A positive electrode and a negative electrode were fabricated in the same manner as in Example 1. A polyethylene separator was interposed between the positive electrode and the negative electrode and a prismatic electrode jelly-roll was fabricated. Metal foil current collectors and electrode tabs of the positive electrode and the negative electrode were disposed in parallel to the winding axis by welding the same at the center of the prismatic electrode jelly-roll at which the electrode jelly-roll 10 started to be wound, and, after the electrode jelly-roll 10 was wound, the outermost end portions of the electrode jelly-roll 10 were fixed using adhesive tape. Next, electrode tabs of the positive electrode and the negative electrode protruding in opposite directions were intact. Here, the greatest distance between the two opposite curved surfaces of the electrode jelly-roll 10 was about 40 mm and a distance between two opposite side surfaces facing each other was about 20 mm.

A laminate battery was manufactured by surrounding the electrode assembly with a pouch, injecting the same electrolyte as used in Example 1 thereinto, and vacuum sealing the pouch. Without tabs protruding to the outside, a length of the completed battery was 44.5 mm, the width was 30.0 mm, the greatest thickness was 2.76 mm, the measured discharge energy was about 833 mWh, and the energy density was about 226 Wh/l (based on a cuboidal-type battery).

Comparative Example 2

The battery according to the first comparative embodiment was curved to have a curved surface with an inner curvature radio of 50 mm. Measured discharge energy of the same was about 823 mWh.

As described above, the first embodiment featured improved energy density by changing the directions in which the electrode tabs and wirings are connected with respect to an electrode jelly-roll, as compared to Comparative Example 1. In the case of the curved battery according to Example 2, useful battery shapes may be obtained based on directions in which lead tabs are led out. Since the shape of the battery according to the second embodiment was not cuboidal, energy density was not compared with that of Example 2. However, since the batteries according to Example 2 and Comparative Example 2 were manufactured by bending the batteries according to Example 1 and Comparative Example 1, respectively, it may be determined that energy density was improved based on the curvatures of the batteries Example 1 and Comparative Example 1. Particularly, in consideration of directions in which battery lead tabs are led out, a difference between efficiency of space utilization of batteries in electronic devices may be more significant.

Example 3

A positive electrode and a negative electrode were fabricated in the same manner as in Example 1. A polyethylene separator was interposed between the positive electrode and the negative electrode and an electrode jelly-roll was fabricated. Metal foil current collectors and electrode tabs of the positive electrode and the negative electrode were disposed in parallel to the winding axis by welding the same at the center of the electrode jelly-roll 10 at which the electrode jelly-roll 10 started to be wound, and, after the electrode jelly-roll 10 was wound, the outermost end portions of the electrode jelly-roll 10 were fixed using adhesive tape. The positive electrode tab, formed of aluminum and having a width of 3 mm, and the negative electrode tab, formed of nickel and having a width of 3 mm, were led out from opposite side surfaces of the electrode jelly-roll, respectively. A width of a positive electrode plate was 19 mm, a width of a negative electrode plate was 21 mm, and a width of the separator was 23 mm. Furthermore, a length of the completed electrode jelly-roll, i.e., a distance between the opposite side surfaces, was 23 mm, the width of the same, i.e., a distance between opposite curved surfaces, was 8 mm, and thickness of the same, i.e., a distance between the top surface and the bottom surface, was 3.7 mm.

Figure 34:
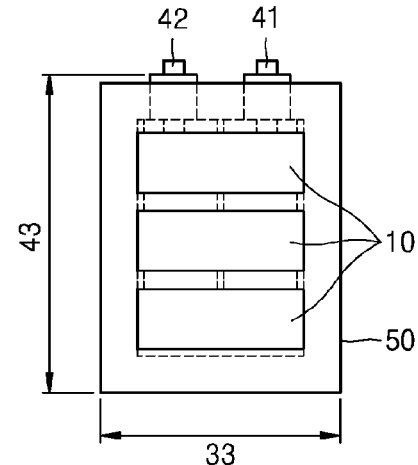
FIG. 34 is a diagram showing a schematic configuration of an embodiment of a secondary battery.

The three electrode jelly-rolls as described above were fabricated, and a laminated battery as shown in FIG. 34 was manufacturing using the same. Thus the three electrode jelly-rolls were disposed next to each other such that the smallest distance between curved surfaces of the electrode jelly-roll adjacent to each other was 2.5 mm, two copper foils each having width of 10 mm and thickness of 15 μm were stacked and welded to three negative electrode tabs as a wiring for a negative electrode, and two aluminum foils each having width of 10 mm and thickness of 15 μm were stacked and welded to three positive electrode tabs as a wiring for a positive electrode. The tabs were bent by about 180 degrees near side surfaces of the electrode jelly-rolls, such that the wirings were disposed close to outer surfaces of the electrode jelly-roll. A positive electrode lead tab 41 and a negative electrode lead tab 42 were welded to end portions of the positive electrode wiring and the negative electrode wiring, respectively. Accordingly, an electrode assembly in which three electrode jelly-rolls are connected in parallel was completed.

The electrode assemblies were surrounded by top and bottom pouch films, the electrolyte, which was same as that of Example 1, was injected therein, and the structure was vacuum-sealed, thereby completing a laminated battery. Width of a sealing unit was about 5 mm. Length in the direction in which the electrode jelly-rolls were disposed of the completed battery, except portions of the electrode lead tabs exposed to outside of a pouch 50, was 43 mm, a width in a winding axis direction of the electrode jelly-roll thereof was 33 mm, and a thickness of the same was 4.2 mm. Measured discharge energy of the same was about 1022 mWh, and energy density was about 171 Wh/l.

Comparative Example 3

Figure 35:
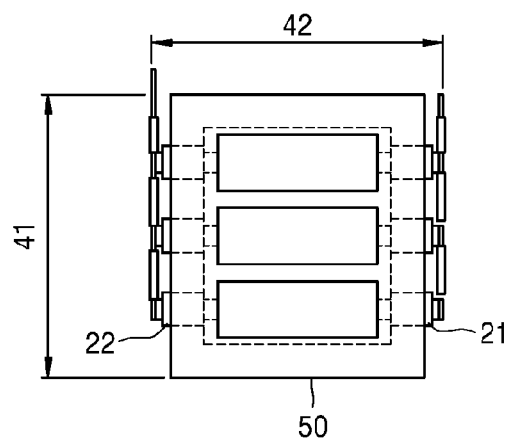
FIGS. 35 and 36 are diagrams showing a schematic configuration of other embodiments secondary batteries.

An electrode jelly-roll was fabricated in the same manner as in Example 3, and a positive electrode tab formed of aluminum and having a width of 3 mm, and a negative electrode formed of nickel and having a width of 3 mm, were led out from opposite side surfaces of the electrode jelly-roll, respectively. The three electrode jelly-rolls as described above was fabricated, and the three electrode jelly-rolls were disposed next to each other, such that the smallest distance between curved surfaces of the electrode of the adjacent jelly-roll was 2.5 mm. However, unlike in Example 3, the three electrode jelly-rolls were not connected in parallel within the pouch 50, and, as shown in FIG. 35, first and second electrode tabs 21 and 22 were not bent and both of the first and second electrode tabs 21 and 22 were led out to outside the pouch 50.

The electrode assemblies were surrounded by top and bottom pouch films, an electrolyte which was the same as that of Example 1 was injected therein, and the structure was vacuum-sealed, thereby completing a laminated battery. A width of a sealing unit was about 5 mm. The three first electrode tabs 21 led out to the outside were weld-connected using a coated wire of which an outer diameter of a coating is about 1 mm, whereas the three second electrode tabs led out to the outside were solder-connected using a coated wire of which an outer diameter of a coating is about 1 mm.

A length in the direction in which the electrode jelly-rolls were disposed of the completed battery, except portions of the electrode lead tabs exposed to outside of a pouch 50, was 41 mm, a width in a winding axis direction of the electrode jelly-roll thereof was 42 mm, and thickness of the same was 4.0 mm. Measured discharge energy of the same was about 1007 mWh, and energy density was about 146 Wh/l.

Comparative Example 4

Figure 36:
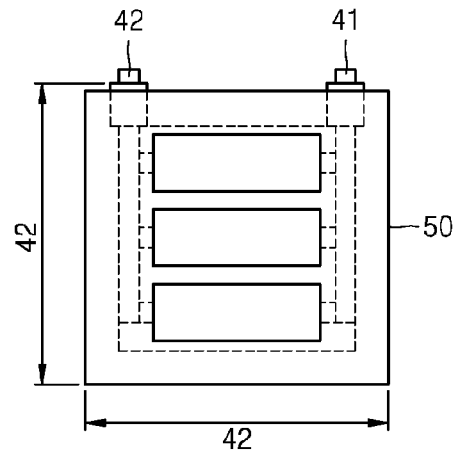

An electrode jelly-roll was fabricated in the same manner as in Example 3, and a positive electrode tab formed of aluminum and having a width of 3 mm, and a negative electrode formed of nickel and having a width of 3 mm, were led out from opposite side surfaces of the electrode jelly-roll, respectively. The three electrode jelly-rolls as described above were fabricated, and the three electrode jelly-rolls were disposed next to each other, such that the smallest distance between curved surfaces of the adjacent electrode jelly-roll was 2.5 mm. However, unlike in Example 3, the electrode tabs were not bent, and, as shown in FIG. 36, lead tabs 41 and 42 were welded to electrode tabs, thereby the three electrode jelly-rolls were connected to in parallel.

The electrode assemblies were surrounded by top and bottom pouch films, the electrolyte, which was same as that of Example 1, was injected therein, and the structure was vacuum-sealed, thereby completing a laminated battery. A width of a sealing unit was about 5 mm. A length in the direction in which the electrode jelly-rolls were disposed of the completed battery, except portions of the electrode lead tabs exposed to outside of a pouch 50, was 42 mm, a width in a winding axis direction of the electrode jelly-roll thereof was 42 mm, and a thickness of the same was 4.0 mm. Measured discharge energy of the same was about 1014 mWh, and energy density was about 144 Wh/l.

Example 4

A positive electrode and a negative electrode were fabricated in the same manner as in Example 1. A polyethylene separator was interposed between the positive electrode and the negative electrode and an electrode jelly-roll was fabricated. Metal foil current collectors and electrode tabs of the positive electrode and the negative electrode were disposed in parallel to the winding axis by welding the same at the center of the electrode jelly-roll 10 at which the electrode jelly-roll 10 started to be wound, and, after the electrode jelly-roll 10 was wound, the outermost end portions of the electrode jelly-roll 10 were fixed using adhesive tape. The positive electrode tab, formed of aluminum and having a width of 3 mm, and the negative electrode, formed of nickel and having a width of 3 mm, were led out from opposite side surfaces of the electrode jelly-roll, respectively. A width of a positive electrode plate was 19 mm, a width of a negative electrode plate was 21 mm, and a width of the separator was 23 mm. Furthermore, a length of the completed electrode jelly-roll, i.e., that is, a distance between opposite side surfaces, was 23 mm, a width of the same, i.e., a distance between opposite curved surfaces, was 8 mm, and thickness of the same, i.e., a distance between the top surface and the bottom surface, was 3.3 mm.

The three electrode jelly-rolls as described above were fabricated, and a laminated battery having a structure as shown in FIG. 34 was fabricated. In other words, the three electrode jelly-rolls were disposed next to each other, such that the smallest distance between curved surfaces of the adjacent electrode jelly-roll was 2.5 mm, two copper foils having width of 10 mm and thickness of 15 μm were stacked and welded to three negative electrode tabs as a wiring for a negative electrode, and two aluminum foils having width of 10 mm and thickness of 15 μm were stacked and welded to three positive electrode tabs as a wiring for a positive electrode. The tabs were bent by about 180 degrees nearby side surfaces of the electrode jelly-rolls, such that the wirings were disposed close to outer surfaces of the electrode jelly-roll. A positive electrode lead tab 41 and a negative electrode lead tab 42 were welded to end portions of the positive electrode wiring and the negative electrode wiring, respectively. Accordingly, an electrode assembly in which three electrode jelly-rolls were connected in parallel was completed.

The electrode assemblies were surrounded by top and bottom pouch films, the electrolyte, which was same as that of Example 1, was injected, and the structure was vacuum-sealed, thereby completing a laminated battery. A width of a sealing unit was about 5 mm. A length in the direction in which the electrode jelly-rolls were disposed of the completed battery, except portions of the electrode lead tabs exposed to outside of the pouch 50, was 43 mm, a width in a winding axis direction of the electrode jelly-roll thereof was 33 mm, and a thickness of the same was 3.8 mm. Here, measured discharge energy of the same when the battery was flat was about 915 mWh, whereas measured discharge energy when the battery was bent by the radius of curvature of 10 mm was about 922 mWh. Furthermore, measured discharge energy when the battery was repeatedly bent by the radius of curvature of 10 mm and unbent for 1000 times was 920 mWh.

In the above-stated embodiments, the discharge energy was measured by using TOSCAT-3000 system of TOYO SYSTEM, Japan. Charging and discharging were performed at 25° C., where the voltage was from about 3.0V to about 4.5V. In Examples 1 and 2, and Comparative Examples 1 and 2, initial charging/discharging were performed with a current of 24.4 milliamperes (mA) and discharge energy was measured by using a current of 121.5 mA. Furthermore, in Example 3 and Comparative Examples 3 and 4, initial charging/discharging were performed with a current of 30.7 mA and discharge energy was measured by using a current of 153.3 mA. Furthermore, in Example 4, initial charging/discharging were performed with a current of 25.0 mA and discharge energy was measured by using a current of 125.5 mA.

Figure 37:
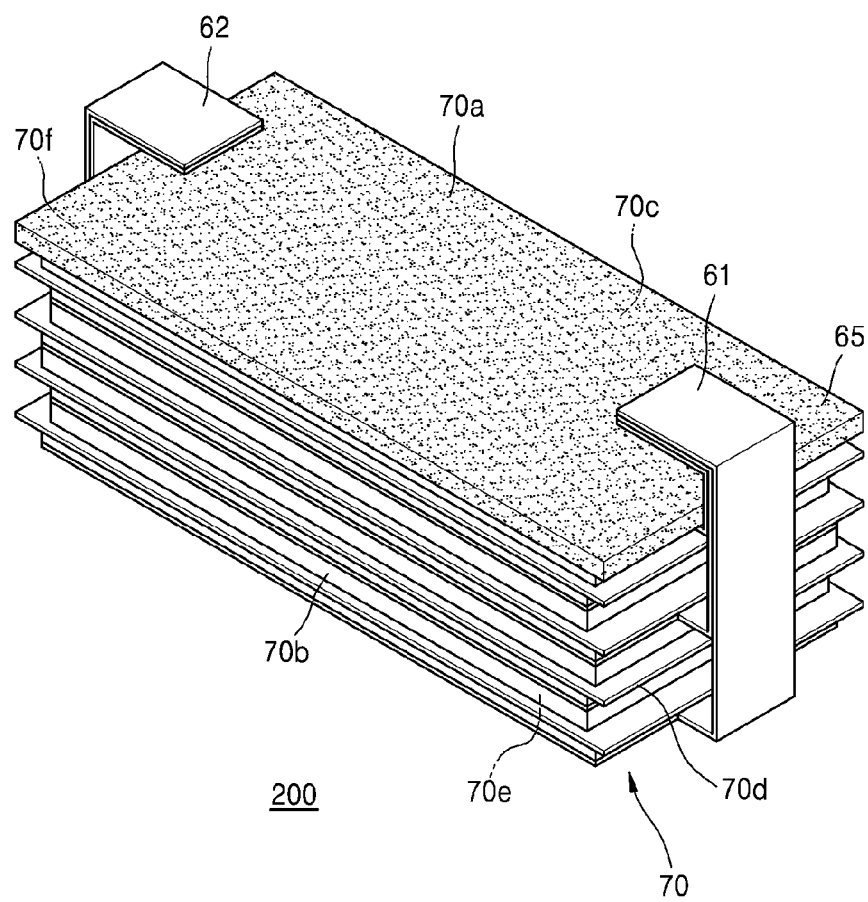
FIG. 37 is a schematic perspective view of another embodiment of an electrode assembly.

Although an electrode assembly including a prismatic jelly-roll is described above, the above-stated configurations may also be applied to a stacked electrode assembly including a stacked electrode structure. For example, FIG. 37 is a schematic perspective view of an electrode assembly 200 according to another embodiment. Referring to FIG. 37, the electrode assembly 200 may include a stacked electrode structure 70 and first and second electrode tabs 61 and 62 lead out from the stacked electrode structure 70. Here, an end portion of at least one of the first electrode tab 61 and the second electrode tab 62 may be bent in a direction opposite to a lead-out direction and be arranged to face an outer surface of the stacked electrode structure 70. Although FIG. 37 shows that both the first electrode tab 61 and the second electrode tab 62 face an outer surface of the tacked electrode structure 70, in an embodiment, only one of the first and second electrode tabs 61 and 62 may face the outer surface of the stacked electrode structure 70.

Figure 38:
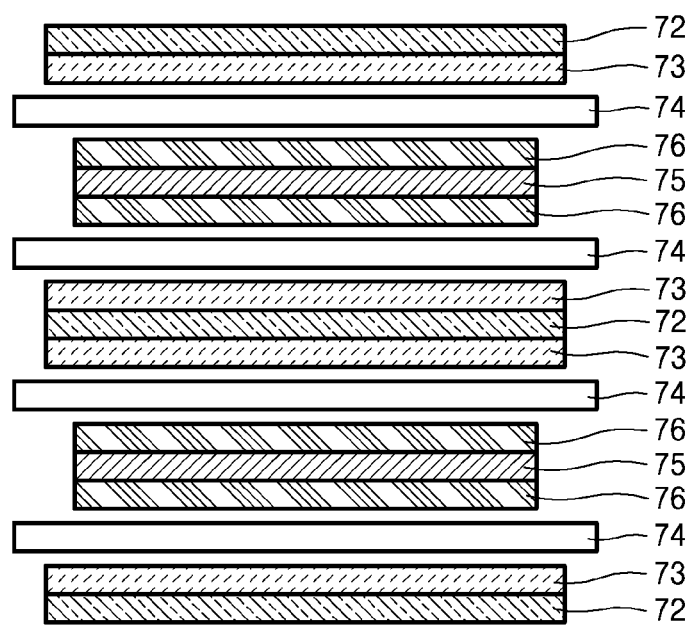
FIG. 38 is a schematic sectional view of an stacked electrode structure of the electrode assembly shown in FIG. 37.

FIG. 38 is a schematic sectional view of the stacked electrode structure 70 of the electrode assembly 200. Referring to FIG. 38, the stacked electrode structure 70 may include a plurality of first electrode plates 72 and 73, a plurality of second electrode plates 75 and 76, and a plurality of insulative separators 74, which are respectively interposed between the plurality of first electrode plates 72 and 73 and the plurality of second electrode plates 75 and 76. As shown in FIG. 38, the stacked electrode structure 70 may be formed by stacking the plurality of first electrode plates 72 and 73, the plurality of separators 74, and the plurality of second electrode plates 75 and 76, such that the separators 74 are arranged between the first electrode plates 72 and 73 and the second electrode plates 75 and 76. Although FIG. 38 shows that the first electrode plates 72 and 73 are located at the topmost portion and the bottommost portion of the stacked electrode structure 70, respectively, the present embodiment is not limited thereto. Furthermore, each of the first electrode plates 72 and 73 and the second electrode plates 75 and 76 may have flat plate-like shapes. However, the present embodiment is not limited thereto. For example, after the stacked electrode structure 70 is fabricated, the stacked electrode structure 70 may be bent. Furthermore, in an embodiment, the stacked electrode structure 70 may include only one each of first electrode plates 72 and 73, a single separator 74, and one each of second electrode plates 75 and 76. The stacked electrode structure 70 may be formed by folding at least one from among the first electrode plates 72 and 73, the separators 74, and the second electrode plates 75 and 76. For example, one serpentine and continuous separator 74 may be arranged between the plurality of first electrode plates 72 and 73 and the second electrode plates 75 and 76 by folding the separator 74, thereby constituting the stacked electrode structure 70.

Furthermore, each of the first electrode plates 72 and 73 of the stacked electrode structure 70 may include a first electrode current collector 72 and a first active material layer 73 applied onto the first electrode current collector 72. In the same regard, each of the second electrode plates 75 and 76 may include a second electrode current collector 75 and a second active material layer 76 applied onto the second electrode current collector 75. For example, the first electrode plates 72 and 73 may be positive electrode plates, where the first active material layer 73 may be formed by mixing a positive electrode material, a conductive material, and a binder. Furthermore, the second electrode plates 75 and 76 may be negative electrode plates, where the second active material layer 76 may be formed by mixing a negative electrode material, a conductive material, and a binder. Although FIG. 38 shows that the stacked electrode structure 70 includes a plurality of separated first electrode current collectors 72 and a plurality of separated second electrode current collectors 75, in an embodiment, the stacked electrode structure 70 may include only one first electrode current collector 72 and the only one second electrode current collector 75.

Referring back to FIG. 37, outer surfaces of the stacked electrode structure 70 may include a top surface 70a and a bottom surface 70e, which are perpendicular to the stacking direction of the stacked electrode structure 70 and face each other. Furthermore, the stacked electrode structure 70 may include a first side surface 70d and a second side surface 70f, which are parallel to the stacking direction of the stacked electrode structure 70 and face each other, and a front surface 70b and a rear surface 70c, which are parallel to the stacking direction of the stacked electrode structure 70 and face each other. The top surface 70a and the bottom surface 70e may be formed to smooth surfaces, where a distance between the top surface 70a and the bottom surface 70e may be substantially constant. For example, the top surface 70a and the bottom surface 70e may be formed of one of the first electrode current collector 72 and the second electrode current collector 75. The first electrode plates 72 and 73, the separators 74, and the second electrode plates 75 and 76 may be partially exposed by the first side surface 70d, the second side surface 70f, the front surface 70b, and the rear surface 70c. Therefore, the first side surface 70d, the second side surface 70f, the front surface 70b, and the rear surface 70c may not be a smooth and continuous single surface, but may be a virtual surface interconnecting edges of the first electrode plates 72 and 73, the separators 74, and the second electrode plates 75 and 76.

The first electrode tab 61 may be electrically connected to the first electrode plates 72 and 73, whereas the second electrode tab 62 may be electrically connected to the second electrode plates 75 and 76. As shown in FIG. 37, the first electrode tab 61 may be led out from the first side surface 70d of the stacked electrode structure 70 in a direction perpendicular to the first side surface 70d. Furthermore, the first electrode tab 61 may be bent by about 180 degrees, i.e., in a direction opposite to the direction in which the first electrode tab 61 is led out, such that an end portion of the first electrode tab 61 faces the top surface 70a of the stacked electrode structure 70. Furthermore, the second electrode tab 62 may be led out from the second side surface 70f of the stacked electrode structure 70 in a direction perpendicular to the second side surface 70f. Furthermore, the second electrode tab 62 may be bent by about 180 degrees (that is, in a direction opposite to the direction in which the second electrode tab 62 is led out), such that an end portion of the second electrode tab 62 faces the top surface 70a of the stacked electrode structure 70. Also, although FIG. 37 shows that the first electrode tab 61 and the second electrode tab 62 are led out from the first side surface 70d and the second side surface 70f, which are opposite to each other, both the first electrode tab 61 and the second electrode tab 62 may be led out from the first side surface 70d only or may be led out from the second side surface 70f only.

In an embodiment, end portions of the first and second electrode tabs 61 and 62 may closely contact the top surface 70a of the stacked electrode structure 70 or may be slightly apart from the top surface 70a of the stacked electrode structure 70. Considering that energy density of a battery may be deteriorated if a gap between the end portions of the first and second electrode tabs 61 and 62 and the top surface 70a exceeds a particular limit, the gap between the first and second electrode tabs 61 and 62 and the top surface 70a may be less than or equal to 1 mm, for example. To prevent occurrence of electric short-circuits when the end portions of the first and second electrode tabs 61 and 62 contact the top surface 70a of the stacked electrode structure 70, an insulation layer 65 may be arranged on the top surface 70a of the stacked electrode structure 70.

Furthermore, as shown in FIG. 37, if the stacked electrode structure 70 includes the plurality of first electrode plates 72 and 73 and the plurality of second electrode plates 75 and 76, a plurality of first electrode tabs 61 may be led out from the first side surface 70d of the stacked electrode structure 70 and a plurality of second electrode tabs 62 may be led out from the second side surface 70f of the stacked electrode structure 70. The plurality of first electrode tabs 61 may be connected to one another and may be bent to be above the top surface 70a. In the same regard, a plurality of second electrode tabs 62 may be connected to one another and may be bent to be above the top surface 70a. The plurality of first electrode tabs 61 may be electrically connected to the plurality of first electrode plates 72 and 73, respectively. Furthermore, the plurality of second electrode tabs 62 may be electrically connected to the plurality of second electrode plates 75 and 76, respectively. For example, the plurality of first electrode tabs 61 may be respectively connected to uncoated portions of the plurality of first electrode current collectors 72 or may respectively extend integrally from uncoated portions of the first electrode current collector 72. Furthermore, the plurality of second electrode tabs 62 may be respectively connected to uncoated portions of the plurality of second electrode current collector 75 or may respectively extend integrally from uncoated portions of the second electrode current collector 75.

Figure 39:
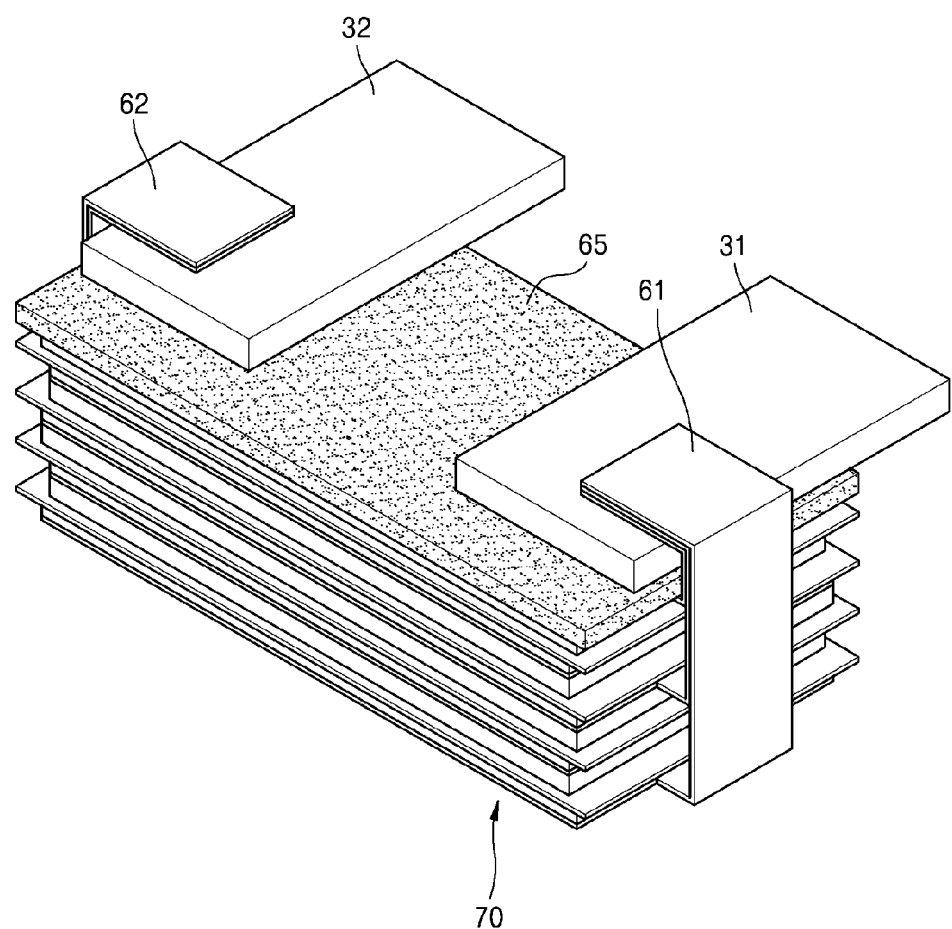
FIGS. 39 through 42 are schematic perspective views of other embodiments of electrode assemblies.

Also, referring to FIG. 39, the electrode assembly 200 as shown in FIG. 37 may further include the first wiring 31 electrically connected to the first electrode tab 61 and the second wiring 32 electrically connected to the second electrode tab 62. As shown in FIG. 39, the first wiring 31 and the second wiring 32 may extend in a direction perpendicular to the directions in which the first electrode tab 61 and the second electrode tab 62 are respectively led out. Although FIG. 39 shows that the first and second wirings 31 and 32 protrude from the rear surface 70c of the electrode assembly 200, the first and second wirings 31 and 32 may also protrude from the front surface 70b. The first and second wirings 31 and 32 may be formed in shapes of long flat sheets. For example, widths of the first and second wirings 31 and 32 may be 10 times or greater than a thicknesses thereof, e.g., from about 50 times to about 10000 times. The sheet-like first and second wirings 31 and 32 may be very useful for flexibly interconnecting the plurality of stacked electrode structures 70. Furthermore, although FIG. 39 shows that the first and second wirings 31 and 32 are respectively arranged below the first and second electrode tabs 61 and 62, the first and second wirings 31 and 32 may also be arranged above the first and second electrode tabs 61 and 62.

Figure 40:
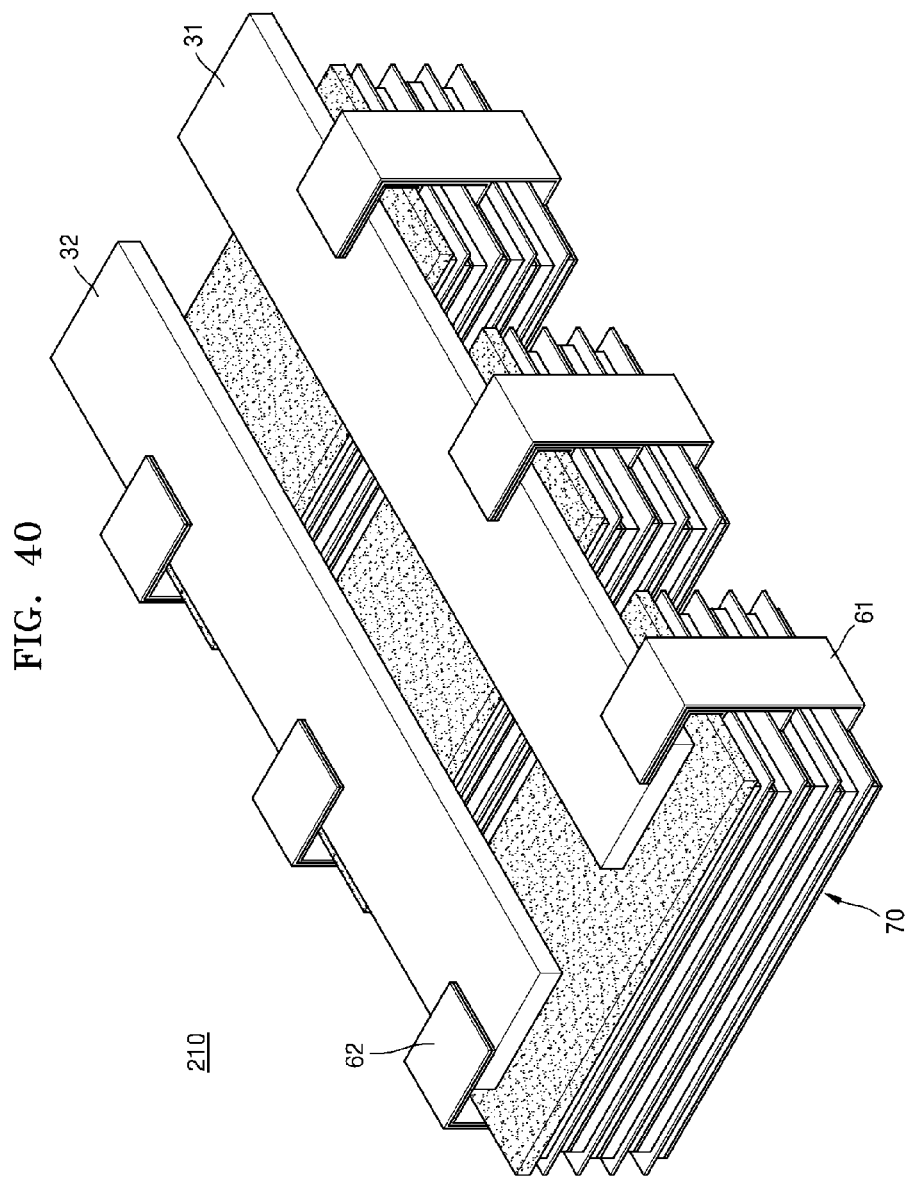

FIG. 40 is a schematic perspective view of an electrode assembly 210 according to another embodiment, in which the plurality of stacked electrode structures 70 is connected in parallel. Referring to FIG. 40, the electrode jelly-roll 10 may include the plurality of stacked electrode structures 70 and the plurality of first and second electrode tabs 61 and 62 arranged at each of the plurality of stacked electrode structures 70. The plurality of stacked electrode structures 70 may be electrically connected in parallel via the first and second wirings 31 and 32. To this end, the single first wiring 31 extending in a direction perpendicular to the direction in which the first electrode tab 61 is led out may be electrically connected to the plurality of first electrode tabs 21, whereas the single second wiring 32 extending in a direction perpendicular to the direction in which the second electrode tab 62 is led out may be electrically connected to the plurality of second electrode tabs 22. Although not shown in FIG. 40, the lead tabs 41 and 42 as shown in FIG. 23 may be connected to the first and second wirings 31 and 32, respectively. A flexible battery with high reliability, high durability, and improved energy density may be provided by using the electrode assembly 210.

Figure 41:
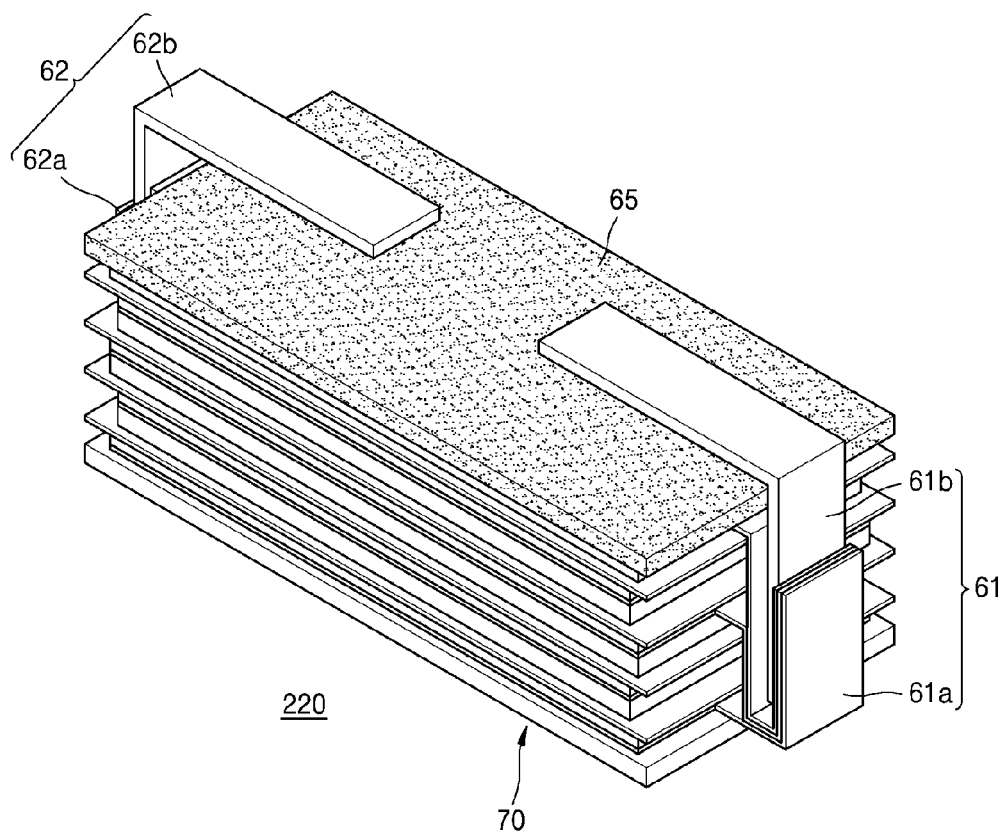

FIG. 41 is a schematic perspective view of an electrode assembly 220 according to another embodiment. In the embodiment shown in FIG. 41, each of the first electrode tab 61 and the second electrode tab 62 may include two portions. For example, the first electrode tab 61 may include a plurality of first portions 61a, which are led out from the first side surface 70d of the stacked electrode structure 70 and are connected to one another, and a second portion 61b, which is bent by about 90 degrees to simultaneously face the top surface 70a and the first side surface 70d of the stacked electrode structure 70. The first portions 61a and the second portion 61b of the first electrode tab 61 may be connected to each other on the first side surface 70d of the stacked electrode structure 70. For example, the first portions 61a may be formed as non-coating portions of the plurality of first electrode current collectors 72 protrude from the first side surface 70d of the stacked electrode structure 70. The first portions 61a may be bent by about 180 degrees to surround two outer surfaces of the second portion 61b facing each other, where the second portion 61b may be inserted into a groove formed as the first portions 61a are bent by about 180 degrees.

In the same regard, the second electrode tab 62 may include a plurality of first portions 62a, which are led out from the second side surface 70f of the stacked electrode structure 70 and are connected to one another, and a second portion 62b, which is bent by about 90 degrees to simultaneously face the top surface 70a and the second side surface 70f of the stacked electrode structure 70. The first portions 62a and the second portion 62b of the second electrode tab 62 may be connected to each other on the second side surface 70f of the stacked electrode structure 70. For example, the first portions 62a may be formed as non-coating portions of the plurality of second electrode current collectors 75 protrude from the second side surface 70f of the stacked electrode structure 70. The first portions 62a may be bent by about 180 degrees to surround two outer surfaces of the second portion 62b facing each other, where the second portion 62b may be inserted into a groove formed as the first portions 62a are bent by about 180 degrees.

Figure 42:
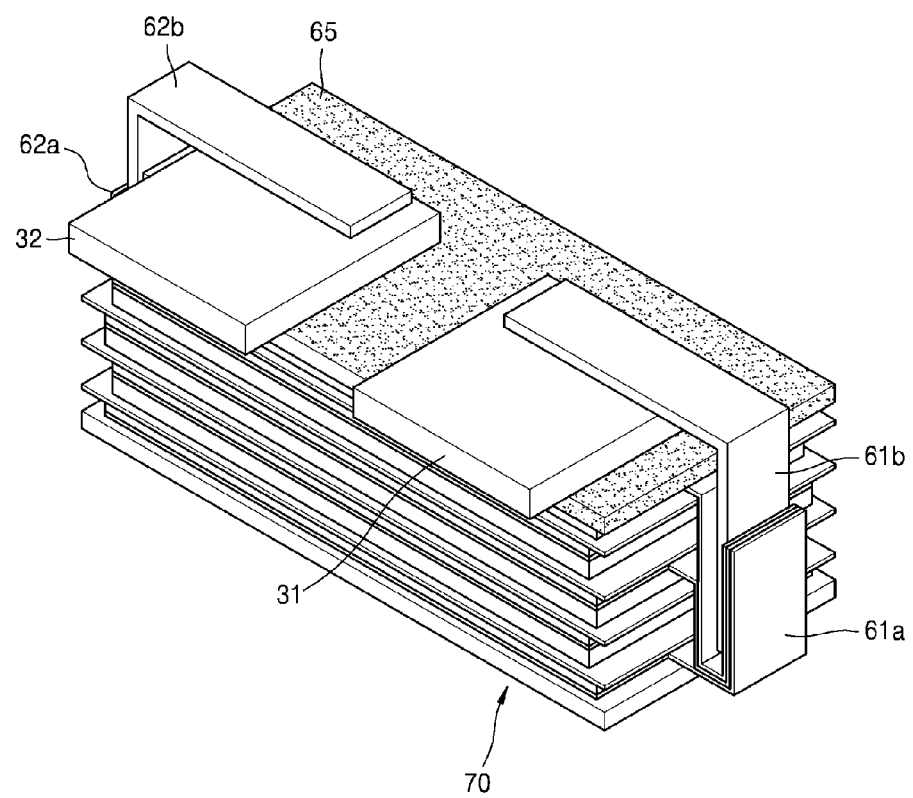

As shown in FIG. 42, the electrode assembly 220 as shown in FIG. 41 may further include the first wiring 31 electrically connected to the first electrode tab 61 and the second wiring 32 electrically connected to the second electrode tab 62. For example, the first wiring 31 may be connected to the second portions 61b of the first electrode tab 61 on the top surface 70a, whereas the second wiring 32 may be connected to the second portions 62b of the second electrode tab 62 on the top surface 70a. Furthermore, the plurality of stacked electrode structure 70 as shown in FIG. 41 may be connected to one another in parallel by using the first wiring 31 and the second wiring 32, as in the embodiment shown in FIG. 40.

It should be understood that the exemplary embodiments described therein should be considered in a descriptive sense only and not for purposes of limitation. Descriptions of features, advantages, or aspects within each embodiment should typically be considered as available for other similar features, advantages, or aspects in other embodiments.

While one or more embodiments of the present disclosure have been described with reference to the figures, it will be understood by those of ordinary skill in the art that various changes in form and details may be made herein without departing from the spirit and scope of the present disclosure as defined by the following claims.

What is claimed is:

1. An electrode assembly comprising:
    an electrode jelly-roll, which comprises
        a winding comprising a first electrode plate, a second electrode plate, and a separator disposed between the first and second electrode plates,
        an outer surface parallel to a winding axis of the electrode jelly-roll,
        side surfaces perpendicular to the winding axis;
        a first electrode tab, which is electrically connected to the first electrode plate and extends in a winding axis direction of the electrode jelly-roll; and
        a second electrode tab, which is electrically connected to the second electrode plate and extends in a winding axis direction of the electrode jelly-roll,
        wherein at least one of the first electrode tab and the second electrode tab comprises a bend which is disposed between a proximate portion, which extends from the winding in a first direction, and an end portion, which extends in a second direction,
        wherein the second direction is opposite to the first direction, and
        wherein the end portion is on and faces the outer surface of the electrode jelly-roll.

2. The electrode assembly of claim 1,
    wherein the first electrode plate comprises a first current collector, and a positive active material disposed on the first current collector,
    wherein the second electrode plate comprises a second current collector and a negative active material applied on the second current collector,
    wherein the first electrode tab is fixed to a portion of the first current collector on which the positive active material is not disposed, and
    wherein the second electrode tab is fixed to a portion of the second current collector on which the negative active material is not disposed.

3. The electrode assembly of claim 1,
    wherein the first electrode plate comprises a first current collector and a positive active material disposed on the first current collector,
    wherein the second electrode plate comprises a second current collector and a negative active material disposed on the second current collector,
    wherein the first electrode tab is a portion of the first current collector on which the positive active material is not disposed and which protrudes and extends in a direction perpendicular to a lengthwise direction of the first current collector, and
    wherein the second electrode tab is a portion of the second current collector on which the negative active material is not disposed and which protrudes and extends in a direction perpendicular to the lengthwise direction of the second current collector.

4. The electrode assembly of claim 1, wherein the first electrode tab and the second electrode tab are configured to function as lead tabs.

5. The electrode assembly of claim 1,
    wherein the outer surface comprises a top surface and an opposite bottom surface, which are flat and face each other, and
    wherein the electrode jelly-roll further comprises first and second curved surfaces between the top surface and the bottom surface.

6. The electrode assembly of claim 5, wherein the first electrode tab and the second electrode tab extend from the same side surface.

7. The electrode assembly of claim 5, wherein the first electrode tab and the second electrode tab extend from opposite side surfaces.

8. The electrode assembly of claim 7, wherein a line extending from the first electrode tab in a winding axis direction and a line extending from the second electrode tab in a winding axis direction overlap each other.

9. The electrode assembly of claim 7, wherein a line extending from the first electrode tab in a winding axis direction and a line extending from the second electrode tab in a winding axis direction do not overlap each other.

10. The electrode assembly of claim 5, wherein a location of a portion at which the first electrode plate is connected to the first electrode tab is different from location of a portion at which the second electrode plate is connected to the second electrode tab in a height wise direction of the electrode jelly-roll.

11. The electrode assembly of claim 5,
    wherein the first electrode tab is bent to face the top surface, and
    wherein the second electrode tab is bent to face the bottom surface.

12. The electrode assembly of claim 5,
    wherein at least one of the first electrode tab and the second electrode tab comprises a first tab portion disposed in the electrode jelly-roll, a second tab portion disposed on and facing one of the side surfaces, and a third tab portion disposed on and facing the top surface or the bottom surface, wherein the first tab portion and the third tab portion extend in a winding axis direction, and wherein the second tab portion extends in a direction perpendicular to the winding axis such that the first tab portion and the third tab portion do not overlap each other.

13. The electrode assembly of claim 12, wherein at least one of the first electrode tab and the second electrode tab further comprises a fourth tab portion, which extends from the third tab portion in a direction perpendicular to the winding axis.

14. The electrode assembly of claim 1,
wherein the first electrode plate comprises a first current collector and a first active material disposed on the first current collector,
wherein the second electrode plate comprises a second current collector and a second active material applied on the second current collector,
wherein the first electrode tab is an end portion of the first current collector, is a portion on which the first active material is not disposed, does not contact the first active material, and is exposed to an outside of the electrode jelly-roll, and
wherein the second electrode tab is an end portion of the second current collector, is a portion on which the second active material is not disposed, does not contact the second active material, and is exposed to an outside the electrode jelly-roll.

15. The electrode assembly of claim 14, wherein at least one of the end portion of the first current collector on which the first active material is not disposed and which is exposed to the outside of the jelly-roll, and the end portion of the second current collector on which the second active material is not disposed and which is exposed to the outside of the electrode jelly-roll, is folded to extend in a winding axis direction.

16. The electrode assembly of claim 15, wherein the portion of the end portion of the first current collector or the second current collector, which is folded to extend in a winding axis direction, is bent in a direction opposite to a direction in which the portion of the end portion of the first current collector or the second current collector extends.

17. The electrode assembly of claim 1,
wherein the first electrode plate comprises a first current collector and a first active material disposed on the first current collector,
wherein the second electrode plate comprises a second current collector and a second active material disposed on the second current collector, and
wherein an end portion of the first current collector is a portion on which an active material is not disposed, which does not contact the first active material, and which forms an outer surface of the electrode jelly-roll.

18. The electrode assembly of claim 17,
wherein a portion of the second electrode tab is disposed in the electrode jelly-roll and extends from an inside of the electrode jelly-roll, and
wherein the first electrode tab is disposed on an end portion of the first current collector wherein the end portion is exposed to the outside and is a portion on which the active material is not disposed.

19. The electrode assembly of claim 1, wherein at least one the first electrode tab and the second electrode tab comprises a plurality of electrode tabs which are disposed in a single electrode jelly-roll.

20. The electrode assembly of claim 1, wherein an end portion of at least one of the first electrode tab and the second electrode tab, which is disposed on and faces an outer surface of the electrode jelly-roll, comprises a first portion parallel to the winding axis and a second portion, which extends from the first portion in a direction perpendicular to the winding axis and parallel to an outer surface of the electrode jelly-roll.

21. The electrode assembly of claim 20, wherein an end portion of at least one the first electrode tab and the second electrode tab, which is disposed on and faces an outer surface of the electrode jelly-roll, further comprises a third portion, which extends from the second portion in a direction perpendicular to the winding axis and perpendicular to the outer surface of the electrode jelly-roll.

22. The electrode assembly of claim 1, wherein a length of the first electrode tab is different from a length of the second electrode tab.

23. The electrode assembly of claim 1, further comprising:
a first wiring, which is electrically connected to the first electrode tab; and
a second wiring, which is electrically connected to the second electrode tab.

24. The electrode assembly of claim 23, further comprising:
a first lead tab, which is electrically connected to the first wiring; and
a second lead tab, which is electrically connected to the second wiring.

25. The electrode assembly of claim 23,
wherein the first and second wirings each have a sheet shapes, and
wherein a width of the first wiring and a width of the second wiring are each independently from 10 times to 10000 times greater than a thicknesses thereof.

26. The electrode assembly of claim 23, wherein the first and the second wirings comprise at least one of aluminum, copper, stainless steel, and nickel.

27. The electrode assembly of claim 1, further comprising:
a first lead tab, which is electrically connected to the first electrode tab; and
a second lead tab, which is electrically connected to the second electrode tab.

28. The electrode assembly of claim 1, comprising:
a plurality of electrode jelly-rolls; and
a plurality of first and second electrode tabs disposed at the plurality of electrode jelly-rolls, respectively,
wherein the plurality of electrode jelly-rolls are electrically connected in series.

29. The electrode assembly of claim 1,
wherein the outer surface comprises a top surface and a bottom surface,
wherein the electrode jelly-roll further comprises first and second curved surfaces between the top surface and the bottom surface,
wherein a distance between the top surface and the bottom surface is constant, and
wherein the top surface and the bottom surface are curved.

30. The electrode assembly of claim 1, wherein a distance between an end portion of at least one of the first and second electrode tabs, which are disposed to face an outer surface of the electrode jelly-roll, and an outer surface of the electrode jelly-roll is smaller than or equal to 1 millimeter.

31. The electrode assembly of claim 1, wherein a minimum radius of curvature at a bent portion of the at least one of the first electrode tab and the second electrode tab is from about 0.006 millimeter to about 5 millimeter.

32. A secondary battery comprising:
a casing;
an electrode assembly disposed in the casing; and
an electrolyte disposed with the electrode assembly in the casing,
wherein the electrode assembly comprises an electrode jelly-roll, which comprises
a winding comprising a first electrode plate, a second electrode plate, and a separator disposed between the first and second electrode plates,
an outer surface parallel to a winding axis,
first and second side surfaces perpendicular to the winding axis and facing each other;
a first electrode tab, which is electrically connected to the first electrode plate and extends in a winding axis direction of the electrode jelly-roll; and
a second electrode tab, which is electrically connected to the second electrode plate and extends in a winding axis direction of the electrode jelly-roll,
wherein at least one of the first electrode tab and the second electrode tab comprises a bend which is disposed between a proximate portion, which extends from the winding in a first direction, and an end portion, which extends in a second direction,
wherein the second direction is opposite to the first direction, and
wherein the end portion is on and faces the outer surface of the electrode jelly-roll.

33. The secondary battery of claim 32, wherein at least a portion of a first electrode tab or a second electrode tab of the electrode assembly or at least a portion of a first lead tab or a second lead tab connected to the first electrode tab of the second electrode tab extends to an outside the casing.

34. An electronic device comprising a secondary battery, wherein the secondary battery comprises:
a casing;
an electrode assembly disposed in the casing; and
an electrolyte disposed with the electrode assembly in the casing,
wherein the electrode assembly comprises an electrode jelly-roll, which comprises
a winding comprising a first electrode plate, a second electrode plate, and a separator disposed between the first and second electrode plates,
an outer surface parallel to a winding axis of the jelly-roll,
side surfaces perpendicular to the winding axis;
a first electrode tab, which is electrically connected to the first electrode plate and extends in a winding axis direction of the electrode jelly-roll; and
a second electrode tab, which is electrically connected to the second electrode plate and extends in a winding axis direction of the electrode jelly-roll,
wherein at least one of the first electrode tab and the second electrode tab comprises a bend which is disposed between a proximate portion, which extends from the winding in a first direction, and an end portion, which extends in a second direction,
wherein the second direction is opposite to the first direction, and
wherein the end portion is on and faces the outer surface of the electrode jelly-roll.

* * * * *